(12) United States Patent
Lan et al.

(10) Patent No.: US 12,083,745 B2
(45) Date of Patent: Sep. 10, 2024

(54) 3D PRINTING DEVICE AND METHOD FOR INTEGRATED MANUFACTURING OF FUNCTIONALLY GRADIENT MATERIALS AND THREE-DIMENSIONAL STRUCTURES

(71) Applicants: QINGDAO UNIVERSITY OF TECHNOLOGY, Shandong (CN); QINGDAO 5D INTELLIGENT ADDITIVE MANUFACTURING TECHNOLOGY CO., LTD., Shandong (CN)

(72) Inventors: Hongbo Lan, Qingdao (CN); Pengfei Guo, Qingdao (CN); Xin Lin, Qingdao (CN); Guangming Zhang, Qingdao (CN); Xiaoyang Zhu, Qingdao (CN); Jiawei Zhao, Qingdao (CN); Quan Xu, Qingdao (CN); Jianjun Yang, Qingdao (CN)

(73) Assignees: QINGDAO UNIVERSITY OF TECHNOLOGY, Qingdao (CN); QINGDAO 5D INTELLIGENT ADDITIVE MANUFACTURING TECHNOLOGY CO., LTD., Qingdao (CN)

( * ) Notice: Subject to any disclaimer, the term of this patent is extended or adjusted under 35 U.S.C. 154(b) by 325 days.

(21) Appl. No.: 17/636,577

(22) PCT Filed: Feb. 2, 2021

(86) PCT No.: PCT/CN2021/074879
§ 371 (c)(1),
(2) Date: Feb. 18, 2022

(87) PCT Pub. No.: WO2022/151539
PCT Pub. Date: Jul. 21, 2022

(65) Prior Publication Data
US 2023/0158745 A1 May 25, 2023

(30) Foreign Application Priority Data

Jan. 18, 2021 (CN) .......................... 202110061667.2

(51) Int. Cl.
*B29C 64/314* (2017.01)
*B29C 64/118* (2017.01)
(Continued)

(52) U.S. Cl.
CPC .......... *B29C 64/314* (2017.08); *B29C 64/118* (2017.08); *B29C 64/209* (2017.08);
(Continued)

(58) Field of Classification Search
CPC ... B29C 64/314; B29C 64/118; B29C 64/209; B29C 64/40; B33Y 10/00; B33Y 30/00; B33Y 40/00
See application file for complete search history.

(56) References Cited

U.S. PATENT DOCUMENTS

2020/0331195 A1\* 10/2020 Rumbak ............... B29C 64/112

FOREIGN PATENT DOCUMENTS

| CN | 109483872 A | 3/2019 |
| CN | 109732905 A | 5/2019 |

(Continued)

OTHER PUBLICATIONS

Oct. 15, 2021 Search Report issued in International Patent Application No. PCT/CN2021/074879.
(Continued)

*Primary Examiner* — Mathieu D Vargot
(74) *Attorney, Agent, or Firm* — Oliff PLC

(57) ABSTRACT

A 3D printing device and method for integrated manufacturing of functionally gradient materials and three-dimensional structures. The device includes an active and passive mixing and printing module and a constraining and sacrifi-
(Continued)

cial layer printing module. An input end of the active mixing module connects to multiple anti-settling feeding modules, and an output end of the active mixing module connects to the passive mixing and printing module. The passive mixing and printing module and the constraining and sacrificial layer printing module are mounted on one side of an XYZ three-axis module. The constraining and sacrificial layer printing module connects to a constraining and sacrificial layer feeding module and prints and forms a functionally gradient three-dimensional structure. The 3D printing device and method of the invention can realize integrated manufacturing of continuous functionally gradient materials and complex three-dimensional structures, and have the advantages of high printing efficiency and low cost.

17 Claims, 6 Drawing Sheets

(51) Int. Cl.
  *B29C 64/209* (2017.01)
  *B29C 64/40* (2017.01)
  *B33Y 10/00* (2015.01)
  *B33Y 30/00* (2015.01)
  *B33Y 40/00* (2020.01)

(52) U.S. Cl.
  CPC .............. *B29C 64/40* (2017.08); *B33Y 10/00* (2014.12); *B33Y 30/00* (2014.12); *B33Y 40/00* (2014.12)

(56) References Cited

FOREIGN PATENT DOCUMENTS

| | | |
|---|---|---|
| CN | 111284004 A | 6/2020 |
| CN | 111670104 A | 9/2020 |
| CN | 112895441 A | 6/2021 |
| WO | 2016/149104 A1 | 9/2016 |
| WO | 2018/080691 A1 | 5/2018 |

OTHER PUBLICATIONS

Oct. 15, 2021 Written Opinion of the International Searching Authority issued in International Patent Application No. PCT/CN2021/074879.

* cited by examiner

3D PRINTING DEVICE AND METHOD FOR INTEGRATED MANUFACTURING OF FUNCTIONALLY GRADIENT MATERIALS AND THREE-DIMENSIONAL STRUCTURES

TECHNICAL FIELD

The invention relates to the technical fields of additive manufacturing and functionally gradient material/structure manufacturing, and in particular to a 3D printing device and method for integrated manufacturing of functionally gradient materials and three-dimensional structures.

BACKGROUND

A functionally gradient material (FGM) is a heterogeneous composite material. In its fabrication process, advanced compositing technologies are used to make microscopic elements of the material (including material components and microstructure) show a continuous (or quasicontinuous) gradient change in a specific direction, so that the macroscopic properties of the material also show a continuous (or quasicontinuous) gradient change in the same direction. The distinctive feature of the functionally gradient material is the addition of an intermediate transition layer with a gradient change in the material content ratio to the traditional composite material, so that the physical properties of the material change gradually, thereby avoiding or alleviating the defects such as stress concentration, cracking and peeling generated during use of the traditional composite material due to huge differences of physical properties. In addition, the functionally gradient material also has excellent designability. By specifically changing the volume content of each component material or the spatial distribution of the microstructure, the stress distribution inside the structure is optimized, and the requirements of different positions for the usability of the material are met. As a brand-new advanced material, the functionally gradient material solves the problem of interfacial stress in composite material while maintaining the composite property of the material, as well as the cuttability and versatility. Due to their excellent physical and chemical properties, functionally gradient materials have been applied in many fields and industries such as aerospace, biomedicine, nuclear engineering, energy, electromagnetism, optics, flexible electronics, wearable devices, soft robots, high voltage and the like, showing broad engineering application prospects.

According to different compositions of materials contained in the functionally gradient materials, the functionally gradient materials are classified into: (1) inorganic functionally gradient materials, mainly including metal/ceramic, metal/non-metal, metal/metal, ceramic/non-metal, etc.; and (2) polymer functionally gradient materials, mainly including polymer/polymer, polymer/ceramic, polymer/metal, polymer/inorganic filler, etc. However, the research and development of polymer functionally gradient materials currently focus mainly on two categories: polymer/polymer and polymer/inorganic filler. Polymer functionally gradient materials (PGMs) are a general term for a category of functionally gradient materials whose matrix material is a polymer material. Compared with inorganic functionally gradient materials, polymer functionally gradient materials have broader applicability in engineering.

The inventors have found that the existing fabrication methods of functionally gradient materials mainly include: chemical vapor deposition, physical vapor deposition, plasma spraying, self-propagating high-temperature synthesis, powder metallurgy, rotational molding, slip casting, chemical vapor infiltration, electrolytic precipitation, etc. However, these traditional fabrication methods above can only be used to manufacture quasicontinuous (gradient by layers) functionally gradient materials (cannot realize fabrication of continuous functionally gradient materials), and can only form functionally gradient materials and parts with simple structure. In addition, these traditional fabrication methods cannot easily realize uniform mixing of two or more materials (especially when the matrix material is a liquid material and the filler is a nanomaterial), cannot realize formation of continuous gradient complex-shaped parts, and especially completely cannot realize the integrated manufacturing of continuous functionally gradient materials and complex three-dimensional structures. Moreover, these traditional fabrication methods have the defects of complex forming process, low efficiency and high cost. Additive manufacturing technology (3D printing) appearing in recent years provides a brand-new technical solution for manufacturing of functionally gradient materials and functionally gradient structural members, and especially multi-material and multi-scale 3D printing technology provides an ideal solution for integrated manufacturing of continuous functionally gradient materials and complex three-dimensional structural members (parts or products).

According to the existing research findings and information that have been published at home and abroad, 3D printing technologies and techniques that have been proposed for manufacturing of functionally gradient materials/structural members mainly include: directed energy deposition (such as Laser Engineered Net Shaping(LENS)), laser cladding, fused deposition modeling (FDM), polyjet, powder bed fusion, direct ink writing (DIW), etc. However, according to the inventors' research, it is found that these existing 3D printing technologies still have many defects and deficiencies in the manufacturing of functionally gradient materials/structural members: (1) For polymer-based functionally gradient material/structural members, it is still impossible to realize the integrated manufacturing of continuous functionally gradient materials and complex three-dimensional structures, and especially the integrated manufacturing and the precise control of functions and properties of continuous functionally gradient materials and complex three-dimensional structures. For example, for functionally gradient basin insulators that urgently needed in ultra-high voltage industry, there is still no technique that can meet for requirements of practical engineering manufacturing (for both a continuous functionally gradient dielectric constant and a complex geometric shape of a basin structure). (2) The formed materials are limited. Especially for the photosensitive resin (first material)/micro-nano material filler (second material) system which is widely used in the engineering field at present, it is difficult to obtain high-performance functionally gradient members (products). Usually, the lower the viscosity of the matrix material, the higher the content of the solid micro-nano filler that can be added, the larger the functional gradient that can be realized, and the better the properties of the functionally gradient member (product). However, a low-viscosity matrix material (with no filler added or low filler content) spreads (flows and infiltrates) severely at the beginning of printing, making it difficult to realize precise geometric shape control and high surface roughness, so the formed parts have poor geometric shape resolution and surface roughness. In addition, when the second material added has a high solid content or has a large particle size, the material settles severely, making it difficult to realize stable printing and ensuring continuous gradient performance. (3) The functionally gradient members (products) printed have poor resolution. The existing 3D printing technologies for manufacturing of functionally gradient materials/structural members still cannot realize manufacturing of functionally gradient materials/structural members with micro-scale and sub-micro-scale resolution. The minimum amount (droplets, filaments) of the extruded/jetted printing material is still large, and especially the layer thickness cannot be precisely controlled (the components of the filler or the second material change constantly, the technical parameters cannot be adjusted in real time, and the consistency of curing control is poor). (4) Functionally gradient materials/structural members prepared by various existing 3D printing technologies have poor interlayer bonding strength and continuous gradient performance. Since the components of the printing material change constantly, it is difficult to realize precise fast curing (especially for UV-curable resin-based matrix materials, with the continuous increase of the filler (second material), the region with high solid content and the region with low solid filler are very different in curing time and power, and in the existing techniques, all layers are usually printed using the same curing power and curing time, which leads to over-curing and poor interlayer bonding strength in the region with low solid filler and under-curing and poor interlayer bonding strength in the region with high solid content). (5) The functionally gradient members (products) printed have poor consistency and cannot meet the strict requirement of high consistency for members in actual production, and thus, cannot be easily used in actual production (in the actual batch production process, all the fabricated parts are required to have excellent consistency in geometric dimensions and properties, and different regions of the same part, and printed parts in the same batch and different batches should have good consistency). In the printing process of the functionally gradient material, the constant changes in the composition of the material pose great challenges to printing. The optimized parameters in the existing 3D printing techniques are all for specific materials, and even in the case of a composite material, the composition/components of the material will not change in the printing process. However, in terms of printing of functionally gradient materials, the components/composition of the material change constantly, and especially technical parameters of curing and parameters that affect rheological properties change constantly. Even if optimized technical parameters are used, small changes will occur in the printed structure, thereby causing constant changes in properties, geometric structure and surface quality, which poses great challenges to consistency of printed parts. For example, in the existing technologies (especially for photosensitive resin-based materials), due to incomplete curing, the material thickness of each layer varies unevenly (due to the uncertainty of the spreading degree of the printed liquid photosensitive material), so that the thickness of each layer and the internal and external geometric shapes will change, and the printed parts have poor consistency and cannot meet requirements of actual production. (6) The component materials are not mixed uniformly. None of these existing technologies provide a special mixing unit, causing nonuniform mixing, so it is impossible to prepare true high-performance functionally gradient materials/structural members. For example, most of the existing technologies, such as LENS, laser cladding and FDM, adopt the integrated nozzle/printing head structure. It is completely impossible to realize uniform mixing of multiple materials in the integrated nozzle. Especially for LENS and laser cladding materials, the component materials are mixed in a molten pool after being jetted and deposited, so the mixing effect is even worse. In the multi-nozzle structure used in the polyjet technique, multiple materials are also mixed after being deposited and before curing, so multiple component materials cannot be uniformly mixed completely. The powder bed fusion technique also cannot realize uniform mixing of materials (especially for the feeding manner of powder spreading), and has the problem of severe waste of materials. (7) Various existing 3D printing technologies cannot realize manufacturing of continuous functionally gradient materials/structural members, can only realize manufacturing of quasicontinuous functionally gradient material/structural members, and thus, cannot prepare functionally gradient materials/structural members in the true sense. (8) Most of the existing functionally gradient material/structure 3D printing technologies only realize integrated manufacturing of simple two-dimensional or 2.5-dimensional structures, and cannot realize integrated manufacturing of continuous functionally gradient materials and complex three-dimensional structures. (9) The production efficiency is low, and the stability of the manufacturing technique is poor. For examples, for LENS, laser cladding and FDM, the material ratio changes constantly in the printing process, so the technical parameters of printing (laser power, nozzle heating temperature, etc.) must also be adjusted accordingly, resulting in poor technical stability and low printing efficiency in the entire printing process. Especially with the integrated printing head structure in which the mixing and printing functions are integrated, strict order and synchronization must be ensured for feeding, mixing and printing. Otherwise, it will be difficult to successfully print the required functionally gradient material and formed structures, and the improvement of working efficiency will be greatly limited. (10) The types and shapes of available printing materials are limited, and the printing materials need to be processed into the required shape and size in advance. For example, LENS and laser cladding are currently suitable for powder and filaments, and have strict restrictions on the shape and geometric dimensions of the powder and filaments. FDM is currently suitable for filaments, and also has strict restrictions on the geometric dimensions of the filaments. Polyjet is currently only suitable for photosensitive resin materials with extremely low viscosity. Powder bed fusion is suitable for powdery materials, and has stricter restrictions on the geometric shape and dimensions. (11) Each manufacturing technology also has strict restrictions on suitable formed materials. LENS, laser cladding and powder bed fusion are mainly used for manufacturing of metal-based functionally gradient materials/structures. FDM is mainly used for manufacturing of thermoplastic-based functionally gradient materials/structures. Polyjet is mainly used for manufacturing of photocurable resin-based functionally gradient materials/structures.

An invention patent previously disclosed by the inventors (Application Number: 201910204814X, 3D Printer for Integrated Manufacturing of Functionally Gradient Materials and Formed Structures and Working Method Thereof) discloses a 3D printer for integrated manufacturing of functionally gradient materials and formed structures and a working method thereof. This 3D printer is mainly applicable to integrated manufacturing of functionally gradient materials and formed structures by mixing and printing solid-state (solid) raw materials (i.e. powdery/particle solid and powdery/particle solid), and manufacturing of functionally gradient members with simple geometric shape. According to different 3D printing raw materials for functionally gradient structures, the methods for manufacturing functionally gradient materials/structures based on 3D printing are divided into three categories: (1) both raw materials are liquids (liquid-state), that is, liquid-liquid (different volume fractions or mass fractions) mixing and 3D printing; (2) one raw material is a liquid (liquid-state), and the other is a solid (powdery or particle solid, and can be uniformly mixed in the liquid raw material), that is, liquid-solid (different volume fractions or mass fractions) mixing and 3D printing; and (3) both raw materials are solid-state (solids, powdery, particle, filament-like, etc.), that is, solid-solid (different volume fractions or mass fractions) mixing and 3D printing. This invention patent cannot realize printing of functionally gradient materials/structural members of the previous two material systems. In addition, since the distance from the raw material feed end to the printing nozzle is very long, there is a large amount of material stored in the entire pipeline. This invention patent especially cannot realize small-size functionally gradient materials/structural members, and also cannot easily realize manufacturing of complex three-dimensional geometric structures. Thus, this invention patent totally cannot realize integrated manufacturing of functionally gradient materials and formed structures of the previous two material systems.

Another invention patent previously disclosed by the inventors (Application Number: 2020101020099, 3D Printing Device and Printing Method for Integrated Manufacturing of Functionally Gradient Materials and Structures) is mainly used to realize uniform mixing of a liquid (matrix) and a powdery solid (reinforcing phase), and can effectively remove bubbles generated during the mixing of the liquid and the powdery solid, thereby ensuring the quality of the 3D printed product. This invention patent is mainly used for manufacturing of discrete functionally gradient members. This invention patent is directed to the following problems in the liquid-solid powder mixing process: (1) during the mixing, powder is easy to agglomerate and hard to disperse, which is the common problem in the solid-liquid mixing at present; (2) if the viscosity of the liquid is too high, air will be brought in during the mixing, and bubbles are prone to generate, so the solid powder cannot be easily mixed in the liquid uniformly; and (3) feeding, mixing and extrusion of the mixture of solid and liquid in different ratios are completed during the printing, and the whole process takes a short time, which requires a high response speed. For example, for a PDMS-based functionally gradient material, the viscosity of the PDMS is high, solid nanoparticles cannot be easily mixed in the PDMS liquid uniformly, and bubbles are prone to generate during the mixing. The nonuniform distribution of the solid nanoparticles and the generated bubbles will seriously affect the quality of the 3D printed products. Although this invention patent (Application Number: 2020101020099) claims that it can realize integrated manufacturing of continuous gradient materials and complex structures, in fact, the printing process is stopped in the mixing step (during the mixing, a vacuum pump acts to vacuumize a mixing chamber to remove the bubbles in the mixture, and after a period of time, a control valve is opened to restore to the normal pressure, then a certain positive pressure is applied, a high-voltage power supply is turned on, and a three-dimensional moving support moves according to the trajectories in the X and Y directions set by the program and prints the geometric shape of the structure of this layer). It is required to vacuumize the mixing chamber to remove the bubbles in the mixture, and at this time, the printing will pause. Therefore, this invention patent cannot realize integrated manufacturing of continuous functionally gradient materials and complex three-dimensional structures.

In addition, the integrated manufacturing of continuous functionally gradient materials and formed structures by mixing and printing a liquid and a powdery solid (raw materials) also has the following problems during the mixing of the liquid and the solid. (1) The high-solid-content material (solid filler) settles severely, and especially when the particle size is large, there will be problems such as nonuniform mixing and low mixing efficiency. (2) During the mixing, powder is easy to agglomerate, and especially a nano material is hard to disperse uniformly. (3) If the viscosity of the liquid is too high, air will be brought in during the mixing, and bubbles are prone to generate, so the solid powder cannot be easily mixed in the liquid uniformly, which will affect the quality of the finished printed product. (4) Feeding, mixing and extrusion of the mixture of solid and liquid in different ratios are completed during the printing, and the whole process takes a short time, which requires a high response speed. For example, for the field of flexible electronics, various single-material flexible substrates widely used at present are increasingly unable to meet the needs of practical engineering applications.

SUMMARY

In view of the defects in the prior art, the invention provides a 3D printing device and method for integrated manufacturing of functionally gradient materials and three-dimensional structures. The 3D printing device and method are suitable for integrated manufacturing of polymer-based continuous functionally gradient materials and complex three-dimensional structures, and especially can realize integrated manufacturing of continuous functionally gradient materials and complex three-dimensional structures from raw materials respectively having a high solid content and a high viscosity. The 3D printing device and method solve the problem of printing failure caused by settling of the filler (raw material for printing) due to the long printing time or the use of the high-solid-content material or the material containing micro-scale fillers when printing large-size members, and solve the problems (consistency, interlayer bonding properties, precise shape control, fast curing, etc.) that the traditional 3D printing method cannot solve because of the constant changes in the composition/components of the material in the printing process of the continuous functionally gradient material. By using the 3D printing device and method, the types of suitable printing materials are increased. The resulting product has improved properties, including wider gradient range, better interlayer bonding strength and continuous gradient performance. The consistency of the functionally gradient members (products) printed is improved. The flexibility of functional gradient changes of printing is improved. The printing efficiency is improved. The structure of the 3D printer for continuous functionally gradient members (products) is simplified, and the manufacturing cost is reduced.

In order to achieve the above objective, the invention is implemented through the following technical solution:

In a first aspect, an example of the invention provides a 3D printing device for integrated manufacturing of functionally gradient materials and three-dimensional structures, including an active mixing module, a passive mixing and printing module and a constraining and sacrificial layer printing module. An input end of the active mixing module is connected to a plurality of anti-settling feeding modules such that a plurality of materials are actively mixed. An output end of the active mixing module is connected to a passive mixing and printing module such that the actively mixed materials are input into the passive mixing and printing module and subjected to static mixing.

The passive mixing and printing module and the constraining and sacrificial layer printing module are mounted on one side of an XYZ three-axis module. The constraining and sacrificial layer printing module is connected to a constraining and sacrificial layer feeding module and is capable of printing and forming a complex functionally gradient three-dimensional structure with the assistance of a constraining and sacrificial layer material.

The active mixing module includes a vibrational mixing chamber and an active stirring screw mounted in the vibrational mixing chamber, and the vibrational mixing chamber is capable of ultrasonic vibration. The plurality of materials entering the active mixing module are uniformly mixed under the actions of the ultrasonic vibration and the stirring of the active stirring screw and extruded by the active stirring screw.

The passive mixing and printing module includes a passive mixing and printing nozzle and a cylinder module I capable of driving the passive mixing and printing nozzle to move up and down. The constraining and sacrificial layer printing module includes a constraining and sacrificial layer printing nozzle and a cylinder module II capable of driving the constraining and sacrificial layer printing nozzle to move up and down.

In a second aspect, an example of the invention further provides a 3D printing device for integrated manufacturing of functionally gradient materials and three-dimensional structures, including an active mixing module, a passive mixing and printing module and an FDM printing module. An input end of the active mixing module is connected to a plurality of anti-settling feeding modules such that a plurality of materials are actively mixed. An output end of the active mixing module is connected to a passive mixing and printing module such that the actively mixed materials are input into the passive mixing and printing module and subjected to static mixing.

The passive mixing and printing module and the FDM printing module are mounted on one side of an XYZ three-axis module. The FDM printing module is connected to an FDM filament feeding module, and the FDM filament feeding module is capable of feeding a filament into the FDM printing module.

The active mixing module includes a vibrational mixing chamber and an active stirring screw mounted in the vibrational mixing chamber, and the vibrational mixing chamber is capable of ultrasonic vibration. The plurality of materials entering the active mixing module are uniformly mixed under the actions of the ultrasonic vibration and the stirring of the active stirring screw and extruded by the active stirring screw.

The passive mixing and printing module includes a passive mixing and printing nozzle and a cylinder module I capable of driving the passive mixing and printing nozzle to move up and down. The FDM printing module includes an FDM printing nozzle and a cylinder module IV capable of driving the FDM printing nozzle to move up and down.

As a further implementation, the active stirring screw is connected to a stepping motor, and the active stirring screw is mounted along an axial direction inside the vibrational mixing chamber. One end of the vibrational mixing chamber is provided with a discharge port, and the discharge port is connected to the passive mixing and printing nozzle. A side surface of the vibrational mixing chamber is provided with a plurality of feed ports configured to be connected to the anti-settling feeding modules.

As a further implementation, the side surface of the vibrational mixing chamber is provided with a feed port I and a feed port II, the feed port I is connected to the anti-settling feeding module I, and the feed port II is connected to the anti-settling feeding module II.

The anti-settling feeding module I is configured to place a printing material I, the printing material I is a first printing raw material, and the first printing raw material is a photocurable or thermocurable material. The anti-settling feeding module II is configured to place a printing material II, and the printing material II is a uniformly mixed liquid of the first printing raw material and a second printing raw material. The second printing raw material is a micro-nano material.

As a further implementation, the passive mixing and printing nozzle includes a static mixer and a passive mixing and printing nozzle, the passive mixing and printing nozzle is mounted at one end of the static mixer, and the other end of the static mixer is connected to a passive mixing feed port and a passive mixing positive pressure air port.

The passive mixing feed port is connected to the active mixing module through a hose, and the passive mixing positive pressure air port is connected to a positive pressure air passage through a hose. The passive mixing and printing nozzle is connected to a positive electrode of a high voltage DC power supply.

As a further implementation, the constraining and sacrificial layer printing nozzle includes a constraining and sacrificial layer storage vat, one end of the constraining and sacrificial layer storage vat is provided with a constraining and sacrificial layer nozzle heating block and a constraining and sacrificial layer printing nozzle, the other end of the constraining and sacrificial layer storage vat is provided with an adapter, and the constraining and sacrificial layer storage vat is connected to a constraining and sacrificial layer feed port and a constraining and sacrificial layer positive pressure air port through the adapter. The constraining and sacrificial layer printing nozzle is connected to a positive electrode of a high voltage DC power supply.

As a further implementation, the 3D printing device further includes a UV curing module and an auxiliary observation camera module mounted on the XYZ three-axis module. The UV curing module includes a UV curing unit and a cylinder module III capable of driving the UV curing unit to move up and down.

As a further implementation, a printing platform for placing a substrate is disposed below the passive mixing and printing nozzle, the printing platform is mounted above a bottom plate through a base, the printing platform is provided with a heater, and the printing platform can be levelable.

In a third aspect, an example of the invention further provides a 3D printing method for integrated manufacturing of functionally gradient materials and three-dimensional structures using the 3D printing device, including:

step 1: preprocessing of printing:
uniformly mixing a first printing raw material and a second printing raw material according to design requirements to prepare a printing material II; placing the printing material I to an anti-settling feeding module I, placing the printing material II to an anti-settling feeding module II, and placing the printing material III to a constraining and sacrificial layer feeding module or an FDM filament feeding module;

heating a printing platform to a set temperature, enabling the constraining and sacrificial layer printing nozzle or the FDM printing nozzle and a passive mixing and printing nozzle to move to a printing station IIA and the other modules to be in a printing enabled state;

step 2: printing of constraining and sacrificial layer:

enabling a cylinder module II or a cylinder module IV to drive the constraining and sacrificial layer printing nozzle or the FDM printing nozzle to descend to a printing station IIB, turning on the constraining and sacrificial layer feeding module or the FDM filament feeding module, and using the constraining and sacrificial layer printing nozzle or the FDM printing nozzle to complete printing of a restraining layer and a supporting structure according to a set path;

step 3: printing of functionally gradient layer:

moving the passive mixing and printing nozzle to a printing station IA, and enabling the cylinder module II to drive the passive mixing and printing nozzle to descend to a printing station IB; enabling the anti-settling feeding module I and the anti-settling feeding module II to respectively feed the materials to a vibrational mixing chamber in an active mixing module according to a set gradient ratio such that the materials that are mixed by stirring of the active stirring screw and vibration in the active mixing module are further uniformly mixed by a static mixer; and enabling a functionally gradient material to be extruded to a printing nozzle discharge port under the control of an extrusion force of a positive pressure control unit to complete printing of the functionally gradient layer according to a set path; where the printed functionally gradient layer material is within the constraining and sacrificial layer;

step 4: curing of functionally gradient layer:

moving a UV curing unit to a printing station IIIA, and enabling the cylinder module III to drive the UV curing unit to descend to a printing station IIIB; precuring the printed functionally gradient layer according to set time by UV-photocuring or thermocuring; after the functionally gradient layer is precured, and enabling the cylinder module III to drive the UV curing unit to ascend to an initial printing station III C;

step 5: repeating operations of steps 2-4 until the printing of all functionally gradient layer structures is completed;

where after the printing of the current functionally gradient layer is completed, curing is carried out, where the previous precured functionally gradient layer is fully cured, and the current functionally gradient layer is precured;

step 6: post-processing of printing:

after the printing of all the functionally gradient layers is completed, turning off the anti-settling feeding module I, the anti-settling feeding module II, and the constraining and sacrificial layer feeding module or the FDM filament feeding module; enabling the active mixing module, the passive mixing and printing nozzle, the constraining and sacrificial layer printing nozzle or the FDM printing nozzle, and the UV curing unit to return to the initial stations; deactivating the heating function of the printing platform; closing a positive pressure air passage and turning off a high voltage DC power supply;

removing the printed functionally gradient member (product) from the printing platform, and postcuring the functionally gradient member in a UV curing oven or a vacuum oven; and removing the constraining and sacrificial layer to obtain the finished functionally gradient member.

As a further implementation, in step 2, if the printed restraint layer and the supporting structure are micro-scale, a material jet printing mode is adopted. If the printed structure is meso-scale and macro-scale, a material extrusion printing mode is adopted.

In step 3, if the printed functionally gradient layer structure is micro-scale, the material jet printing mode is adopted. If the printed structure is meso-scale and macro-scale, the material extrusion printing mode is adopted.

As a further implementation, different peeling and removing methods are used for different constraining and sacrificial layer materials selected. If the constraining and sacrificial layer material is a water-soluble material, the constraining and sacrificial layer is first peeled manually, and then completely removed in 40-70° C. hot water. If the constraining and sacrificial layer material is a special material such as HIPS, the constraining and sacrificial layer is removed mainly by being dissolved in a limonene solution. If the constraining and sacrificial layer material is ABS or PLA, the constraining and sacrificial layer is removed mainly by manual peeling and optionally assisted by ultrasound and other treatment methods, but the principle of not destroying the functionally gradient member should be followed.

As for the precuring of the printed functionally gradient layer, the degree of precuring is controlled within a range of 60-90% of full curing, and the specific optimized value is selected according to the printed functionally gradient material.

The embodiment of the invention has the following beneficial effects:

(1) In one or more embodiments of the invention, a three-stage material uniform mixing method is used to solve the problems of material agglomeration and nonuniform mixing, thereby realizing high-efficiency uniform mixing of two or more materials and printing of the continuous gradient material. First-stage mixing: The printing material II (a composite material obtained by uniformly mixing the first printing raw material and the second printing raw material) is first premixed thoroughly. The filler and the liquid matrix material are uniformly mixed thoroughly and completely by surface modification (to avoid agglomeration, especially severe agglomeration of the nano-scale filler and the high-solid-content filler), ultrasonic vibration, ball milling or the like. Second-stage mixing: The second-stage mixing of the materials is realized through the screw, so that the printing material I and the printing material II are uniformly mixed continuously and stably in the vibrational mixing chamber. Third-stage mixing: The third-stage mixing of the materials is realized by vibration. The mixture is finally sent into the passive mixing nozzle to realize continuous and stable printing. Thus, after the materials undergo the multistage mixing, the printing material reaching the nozzle has better continuous functional gradient performance.

(2) In one or more embodiments of the invention, the active mixing (screw extrusion+ultrasonic vibration) is introduced to solve the problems in manufacturing of functionally gradient materials from high-solid-content and high-viscosity materials. Meanwhile, the active mixing can effectively prevent the material from settling during the printing. The advantages of the active mixing module and the passive mixing and printing nozzle are fully utilized and combined to realize integrated manufacturing of continuous functionally gradient materials and complex three-dimensional structures from a high-solid-content raw material and a high-viscosity raw material. The anti-settling feeding module I and the anti-settling feeding module II are disposed to solve the following problems: the printing materials, especially those containing micro-scale fillers and high-solid content fillers, are easy to settle, which leads to unstable printing, and especially for members with large size, the printing time is long, which leads to severe settling of the material, and thereby leads to unstable printing. The inverted active mixing module and other strategies are utilized to solve the problem of how to remove bubbles generated when printing and mixing multiple materials, thereby improving the performance and resolution of the printed functionally gradient parts.

(3) In one or more embodiments of the invention, the constraining and sacrificial layer structure is introduced. In the printing using the traditional materials and technique, whether the printing material is a single material or a composite material, the components and properties of the material remain basically unchanged, and the optimized technical parameters for printing are generally applicable throughout the printing process. However, in the printing process of the continuous functionally gradient materials/structures, the composition/components and the physical and chemical properties of the material change in real time, which brings a great challenge to printing. Therefore, the introduction of the constraining and sacrificial layer structure is proposed. This brings about the advantages and significant effects:

1) With the assistance of the constraining and sacrificial layer, the problems of poor printing stability and consistency, that are caused by constant changes in the composition/components and the physical and chemical properties of the material in the printing process of the continuous functionally gradient materials/structures, are solved. The technical parameters for printing have a wide process window, which can ensure the printing resolution, geometric shape, surface quality and continuous gradient performance.

2) The constraining and sacrificial layer structure is used to assist in forming any complex functionally gradient three-dimensional structure. Since the current printed layer is not fully cured, it is difficult to achieve precise control of the geometric shape without the assistance of the constraining and sacrificial layer. The constraining and sacrificial layer assists in maintaining the geometric shape of the formed layer that has not been full cured. Moreover, the constraining and sacrificial layer can assist in precise formation of low-viscosity photosensitive resin materials, and assist in forming complex internal structures, overhanging structures, thin-walled structures, undercut structures, etc.

3) The printing resolution and consistency are improved. The optimized process window is applicable within a very wide range. The use of the constraining and sacrificial layer structure can ensure the thickness of each layer of the printed functionally gradient material/structure to be the set thickness. Whether in the functionally gradient region with low filler content or the functionally gradient region with high filler content in the printed single functionally gradient member (product), the use of the constraining and sacrificial layer structure can ensure the layers to have the same thickness (or set variable thickness or adaptive thickness). Especially for different regions of the same printed member, and printed members in the same batch and different batches, the use of the constraining and sacrificial layer structure can ensure the printed functionally gradient members to have good consistency.

(4) In one or more embodiments of the invention, a two-step curing strategy is introduced, which can effectively enhance the printing efficiency and improve the interlayer bonding strength and continuous gradient performance of the functionally gradient member (product) with the assistance of the constraining and sacrificial layer structure. The specific method is as follows: during the printing of each layer, the printed layer (formed structure layer) is not fully cured (i.e. precured); and after the printing of the current layer is completed, the precured printed layer is fully cured, and the current layer is precured. The introduction of the two-step curing technique can realize precise control of interlayer bonding strength and gradient performance. Therefore, the problems of poor interlayer bonding strength, poor continuous gradient performance and poor resolution in the prior art are solved.

BRIEF DESCRIPTION OF THE DRAWINGS

The accompanying drawings constituting a part of the invention are used for providing a further understanding of the invention. The schematic embodiments and description of the invention are intended to explain the invention, and do not constitute improper restriction to the invention.

Figure 1:
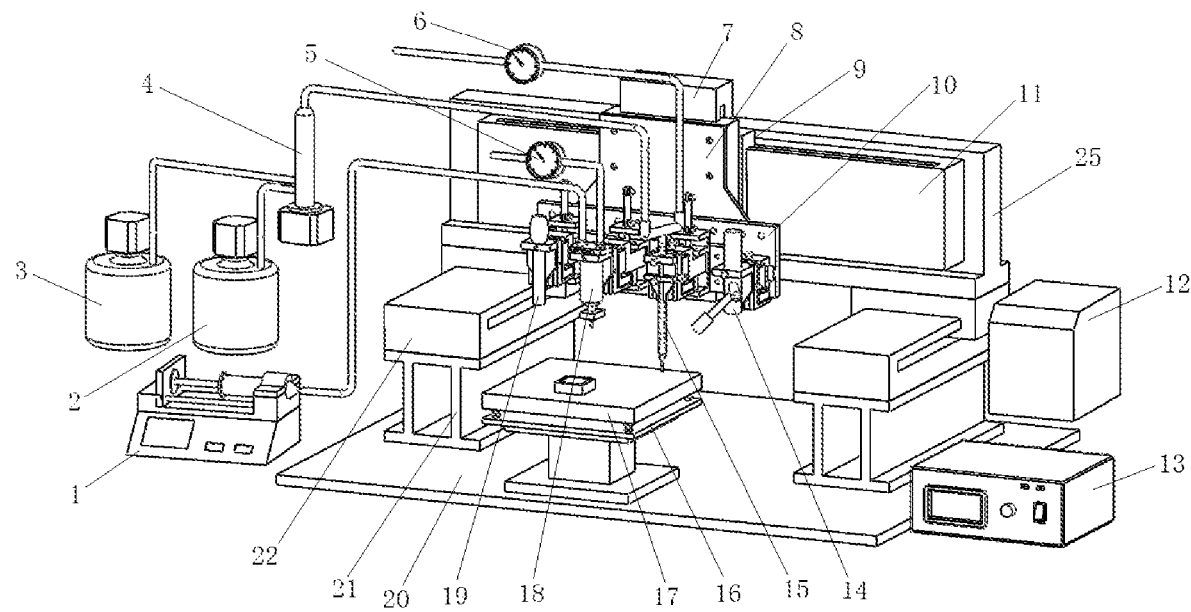
FIG. 1 is a schematic structural diagram of a printing device in a case where a constraining and sacrificial layer is printed by a material extrusion or jet forming technique according to one or more embodiments of the invention.

In the figures, 1. constraining and sacrificial layer feeding module, 2. anti-settling feeding module I, 3. anti-settling feeding module II, 4. active mixing module, 5. air pressure regulator with gauge I, 6. air pressure regulator with gauge II, 7. Z-axis movement module, 8. connecting rack VII, 9. connecting rack I, 10. connecting rack II, 11. X-axis movement module, 12. positive pressure air passage, 13. high voltage DC power supply, 14. auxiliary observation camera module, 15. passive mixing and printing module, 16. base, 17. printing platform, 18. constraining and sacrificial layer printing module, 19. UV curing module, 20. bottom plate, 21. bracket I, 22. Y-axis movement module, 23. FDM filament feeding module, 24. FDM printing module, 25. bracket II;

401. stepping motor, 402. feed port I, 403. feed port II, 404. discharge port, 405. vibrational mixing chamber, 406. active stirring screw, 1401. auxiliary observation camera, 1402. connecting rack VI, 1501. passive mixing and printing nozzle, 150101. passive mixing feed port, 150102. passive mixing positive pressure air port, 150103. static mixer, 150104. passive mixing and printing nozzle, 1502. connecting rack III, 1503. cylinder module I, 1801. constraining and sacrificial layer printing nozzle, 180101. constraining and sacrificial layer feed port, 180102. constraining and sacrificial layer positive pressure air port, 180103. adapter, 180104. ring heater, 180105. constraining and sacrificial layer storage vat, 180106. constraining and sacrificial layer nozzle heating block, 180107. constraining and sacrificial layer printing nozzle, 1802. connecting rack IV, 1803. cylinder module II, 1901. UV curing unit, 1902. connecting rack V, 1903. cylinder module III, 2401. FDM printing nozzle, 240101. stepping motor, 240102. filament feeding port, 240103. filament, 240104. radiating fin, 240105. radiator fan, 240106. FDM nozzle heating block, 240107. FDM printing nozzle, 2402. connecting rack VIII, 2403. cylinder module IV.

DETAILED DESCRIPTION

It should be noted that the following detailed descriptions are all exemplary and are intended to provide a further understanding of this application. Unless otherwise specified, all technical and scientific terms used herein have the same meaning as commonly understood by a person of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should be further understood that terms "include" and/or "comprise" used in this specification indicate that there are features, steps, operations, devices, assemblies, and/or combinations thereof.

For convenient description, the words of "upper", "lower", "left" and "right" in this application, if any, refer to directions corresponding to the up, down, left and right directions of the drawings themselves, and do not limit the structure, but merely facilitate the descriptions of the invention and simplify the descriptions, rather than indicate or imply that the referenced device or element must have a particular orientation, be constructed and operated in a particular orientation, and thus should not be construed as limiting this application. In addition, terms "first" and "second" are merely used for description and should not be understood as indicating or implying relative importance.

For the part of term explanation, terms in this application such as "mount", "connect", "connection", and "fix" should be understood in a broad sense. For example, the connection may be a fixed connection, a detachable connection, or an integral connection, a direct connection, an indirect connection by using an intermediate medium, an interior connection between two components, or interaction between two components. A person of ordinary skill in the art may understand specific meanings of the foregoing terms in the invention according to a specific situation.

Example 1

This example provides a 3D printing device for integrated manufacturing of functionally gradient materials and three-dimensional structures, as shown in FIG. 1, including an XYZ three-axis module, an anti-settling feeding module I 2 (in which high-solid-content materials do no settle after long-time storage), an anti-settling feeding module II 3 (in which high-solid-content materials do no settle after long-time storage), a constraining and sacrificial layer feeding module 1, an active mixing module 4, a positive pressure air passage 12, a high voltage DC power supply 13, an auxiliary observation camera module 14, a passive mixing and printing module 15, a constraining and sacrificial layer printing module 18, a UV curing module 19, a bottom plate 20, a printing platform 17, a base 16, etc.

The XYZ three-axis module includes an X-axis movement module 11, a Y-axis movement module 22 and a Z-axis movement module 7. The Y-axis movement module 22 is fixed above the bottom plate 20 through a bracket I 21. In this example, the number of the Y-axis movement modules 22 is two, and the two Y-axis movement modules 22 are disposed at a certain interval along a length direction of the bottom plate 20. A bracket II 25 is mounted above the Y-axis movement module 22, and one side of the bracket II 25 is provided with the X-axis movement module 11. The Z-axis movement module 7 is connected to the X-axis movement module 11 through a connecting rack I 9.

Further, the printing platform 17 is fixed on the bottom plate 20 through the base 16, and the printing platform 17 is disposed below the printing modules. The printing platform 17 has a leveling function and an electric heating function. A heater disposed at the printing platform 17 is an electric heating rod or an electric heating sheet, and the heating temperature ranges from 20 to 200° C. The flatness of the printing platform is not lower than ±5 μm, and the printing platform can be leveled by the prior art, which will not be described in detail here.

In this example, the X-axis movement module 11 and the Y-axis movement module 22 adopt a gantry structure. The working range of movement platforms of the X-axis movement module 11 and the Y-axis movement module 22 is 0-900 mm, the positioning accuracy is not lower than ±5 μm, the repetitive positioning accuracy is not lower than ±3 mm, and the maximum speed is 500 mm/s. The working range of the Z-axis movement module 7 is 0-300 mm, the positioning accuracy is not lower than ±3 μm, the repetitive positioning accuracy is not lower than ±1 μm, and the maximum speed is 300 mm/s.

Further, the Z-axis movement module 7 is connected to a connecting rack II 10 through a connecting rack VII 8, and the connecting rack II 10 is sequentially provided with the UV curing module 19, the constraining and sacrificial layer printing module 18, the passive mixing and printing module 15 and the auxiliary observation camera module 14. The passive mixing and printing module 15 is connected to the active mixing module 4 and the positive pressure air passage 12 through a pipeline, and the active mixing module 4 is connected to the anti-settling feeding module I 2 and the anti-settling feeding module II 3. The constraining and sacrificial layer printing module 18 is connected to the constraining and sacrificial layer feeding module 1 and the positive pressure air passage 12 through a pipeline. The pipeline connected between the passive mixing and printing module 15 and positive pressure air passage 12 is provided with an air pressure regulator with gauge II6, and the pipeline connected between the constraining and sacrificial layer printing module 18 and the positive pressure air passage 12 is provided with an air pressure regulator with gauge I5.

The constraining and sacrificial layer printing module 18 and the passive mixing and printing module 15 are connected to a positive electrode of the high voltage DC power supply 13. In this example, the high voltage DC power supply 13 can output DC high voltage, AC high voltage and pulse high voltage. The bias voltage is settable, and is continuously adjustable within the set bias voltage range of 0-2 kV. The DC high voltage is 0-5 kV. The output pulse DC voltage is continuously adjustable within the range of 0-±4 kV. The output pulse frequency is continuously adjustable within the range of 0-3000 Hz. The AC high voltage is 0-±4 kV.

Figure 2:
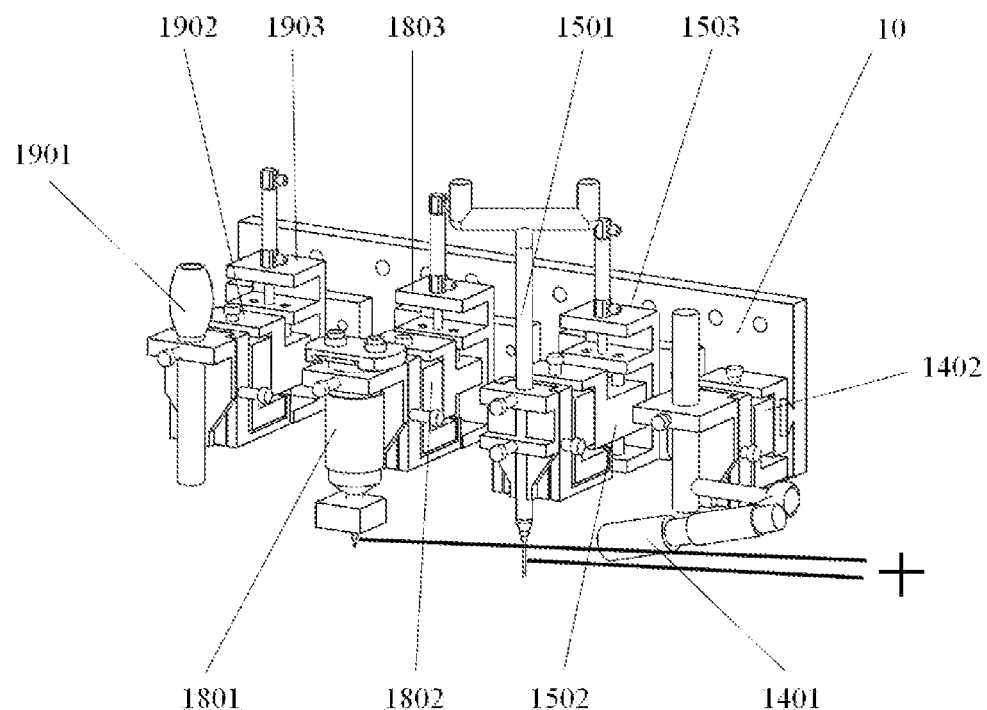
FIG. 2 is a schematic diagram of printing in a case where the constraining and sacrificial layer is printed by material spray forming according to one or more embodiments of the invention.

As shown in FIG. 2, the UV curing module 19 includes a UV curing unit 1901, a connecting rack V 1902 and a cylinder module III 1903. The UV curing unit 1901 is connected to the cylinder module III 1903 through the V1902, and the cylinder module III 1903 is mounted on one end of a side surface of the connecting rack II10. The auxiliary observation camera module 14 includes an auxiliary observation camera 1401 and a connecting rack VI 1402. The auxiliary observation camera 1401 is mounted on the other end of the connecting rack II10 through the connecting rack VI 1402.

Further, the constraining and sacrificial layer printing module 18 includes a constraining and sacrificial layer printing nozzle 1801, a connecting rack IV1802 and a cylinder module II1803. The constraining and sacrificial layer printing nozzle 1801 is connected to the positive electrode of the high voltage DC power supply 13. The constraining and sacrificial layer printing nozzle 1801 is connected to the cylinder module II1803 through the connecting rack IV1802, and the cylinder module II1803 is capable of driving the constraining and sacrificial layer printing nozzle 1801 to move up and down.

Figure 3:
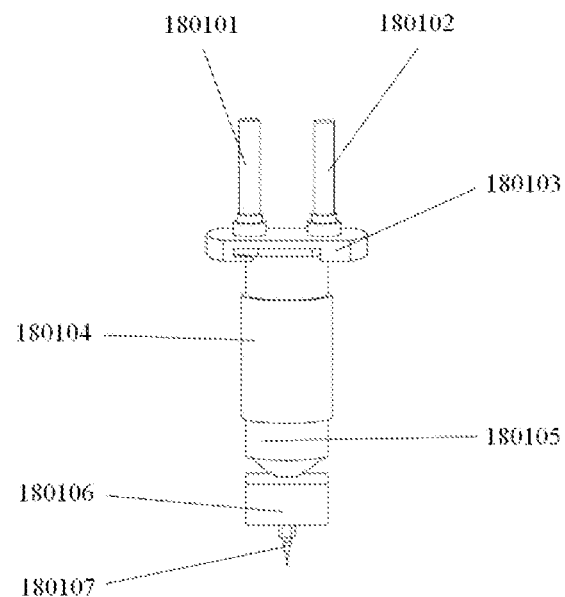
FIG. 3 is a schematic structural diagram of a constraining and sacrificial layer printing nozzle in a case where the constraining and sacrificial layer is printed by a material extrusion or jet forming technique according to one or more embodiments of the invention.

Furthermore, as shown in FIG. 3, the constraining and sacrificial layer printing nozzle 1801 is configured to print a constraining and sacrificial layer material, and includes a constraining and sacrificial layer feed port 180101, a constraining and sacrificial layer positive pressure air port 180102, an adapter 180103, a ring heater 180104, a constraining and sacrificial layer storage vat 180105, a constraining and sacrificial layer nozzle heating block 180106 and a constraining and sacrificial layer printing nozzle 180107. A tail end of the constraining and sacrificial layer storage vat 180105 is connected to the constraining and sacrificial layer printing nozzle 180107 through the constraining and sacrificial layer nozzle heating block 180106, and an outer side of the constraining and sacrificial layer storage vat 180105 is provided with the ring heater 180104. A top of the constraining and sacrificial layer storage vat 180105 is provided with the adapter 180103, and a top end of the constraining and sacrificial layer storage vat 180105 is connected to the constraining and sacrificial layer feed port 180101 and the constraining and sacrificial layer positive pressure air port 180102 through the adapter 180103.

The constraining and sacrificial layer positive pressure air port 180102 is connected to the positive pressure air passage 12 through a hose, and the hose is provided with the air pressure regulator with gauge I5. The constraining and sacrificial layer feed port 180101 is connected to the constraining and sacrificial layer feeding module 1. Extruding the constraining and sacrificial layer material only by a positive pressure control unit is defined as an extrusion printing mode, and jet-forming the constraining and sacrificial layer by the combination of the positive pressure control unit and the high voltage DC power supply 13 is defined as a jet printing mode.

In this example, the constraining and sacrificial layer feeding module 1 adopts a resolution syringe pump, in which a cartridge can be heated and is connected to the constraining and sacrificial layer feed port 180101 through a heatable pipe and the adapter. It can be understood that in other examples, the constraining and sacrificial layer feeding module 1 may also adopt a micro-syringe pump, a peristaltic pump or the like.

The constraining and sacrificial layer printing nozzle 180107 adopts a Musashi nozzle, which is connected to the positive electrode of the high voltage DC power supply 13 through a wire. The Musashi nozzle and a substrate placed on the printing platform 17 form a strong electric field, which drives the material to be jetted and deposited on the substrate.

Further, the passive mixing and printing module 15 includes a passive mixing and printing nozzle 1501, a connecting rack III1502 and a cylinder module I1503. The passive mixing and printing nozzle 1501 is connected to the cylinder module I1503 through the connecting rack III1502, and the cylinder module I1503 is capable of driving the passive mixing and printing nozzle 1501 to move up and down. In this example, the cylinder module I1503, the cylinder module II1803 and the cylinder module III1903 can be replaced with an electric moving stage, a linear positioning platform, a hydraulic cylinder and the like.

Figure 4:
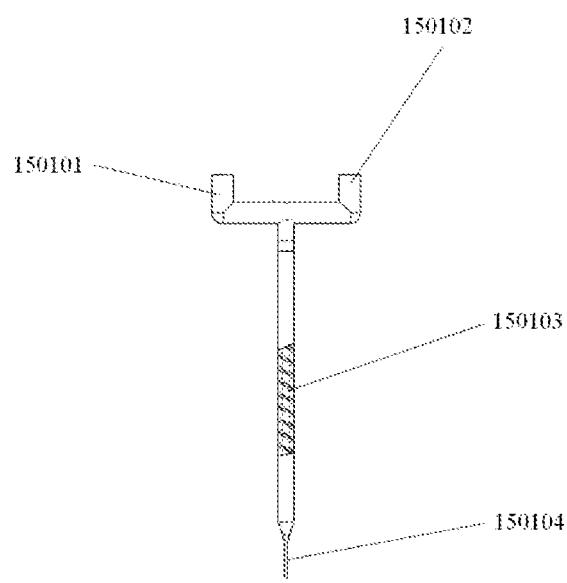
FIG. 4 is a schematic structural diagram of a passive mixing and printing nozzle according to one or more embodiments of the invention.

As shown in FIG. 4, the passive mixing and printing nozzle 1501 includes a passive mixing feed port 150101, a passive mixing positive pressure air port 150102, a static mixer 150103 and a passive mixing and printing nozzle 150104. The passive mixing and printing nozzle 150104 is mounted at one end of the static mixer 150103, and the passive mixing feed port 150101 and the passive mixing positive pressure air port 150102 are mounted at the other end of the static mixer 150103. The passive mixing feed port 150101 is connected to the active mixing module 4 through a hose, and the passive mixing positive pressure air port 150102 is connected to the positive pressure air passage 12 through a hose.

The mixed material from the active mixing module 4 enters the static mixer 150103. The static mixer 150103 has two functions: first, the printing material fed by the active mixing module 4 is further uniformly mixed; and second, the printing material can be supplied to the printing nozzle continuously and stably, so that the printing stability of the continuous functionally gradient material/structure can be ensured. By using the positive pressure air passage 12, the printing material is stably and uniformly fed to the tail end of the printing nozzle from the static mixer 150103.

In this example, the passive mixing and printing nozzle 1501 includes, but not limited to, a metal nozzle, a plastic nozzle, a glass nozzle, a silicon material nozzle, etc., and the nozzle has an inner diameter of 0.5 μm-1 mm. The passive mixing and printing nozzle 1501 adopts an extrusion or jet forming technique to print the functionally gradient material. The working range of the positive pressure air passage 12 is 0.1 bar-1 Mpa.

Figure 5:
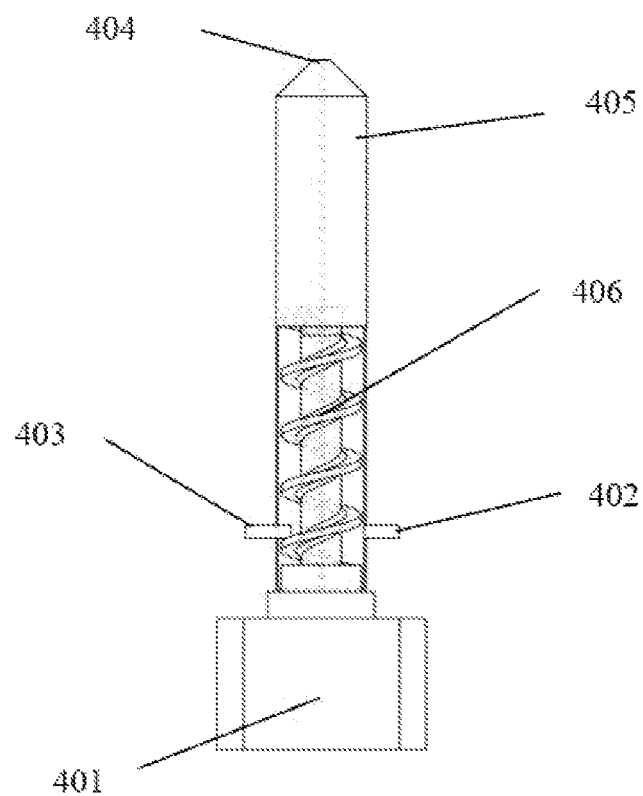
FIG. 5 is a schematic structural diagram of an active mixing module according to one or more embodiments of the invention.

Further, as shown in FIG. 5, the active mixing module 4 includes a stepping motor 401, a vibrational mixing chamber 405 and an active stirring screw 406. The active stirring screw 406 is disposed inside the vibrational mixing chamber 405 coaxially. The vibrational mixing chamber 405 has a function of ultrasonic vibration. The active stirring screw 406 is connected to the stepping motor 401, and the stepping motor 401 is fixed to an outer side of one end of the vibrational mixing chamber 405. The active stirring screw 406 is driven by the stepping motor 401 to rotate, and is capable of uniformly mixing the materials and extruding the mixed material out of the vibrational mixing chamber 405. In this example, the active stirring screw 406 adopts a common stirring screw structure.

The other end of the vibrational mixing chamber 405 is provided with a discharge port 404, and the discharge port 404 is connected to the passive mixing feed port 150101 of the passive mixing and printing nozzle 1501 through a hose. When in use, the vibrational mixing chamber 405 is arranged vertically, the discharge port 404 is located at the top end, and the stepping motor 401 is located at the bottom end. In this example, the discharge port 404 has a frustum-shaped structure.

A side surface of the vibrational mixing chamber 405 is provided with a plurality of feed ports, through which two or more materials can be input. In this example, the side surface of the vibrational mixing chamber 405 is provided with a feed port I402 and a feed port II403, the feed port I402 is connected to the anti-settling feeding module I2, and the feed port II403 is connected to the anti-settling feeding module II3.

The printing material I enters the vibrational mixing chamber 405 through the feed port I402, and the printing material II enters the vibrational mixing chamber 405 through the feed port II403. The active stirring screw 406 is driven by the stepping motor 401 to rotate such that the materials are mixed in the vibrational mixing chamber 405. As the mixing progresses, the mixed material is sent into the connecting hose through the discharge port 404, and then enters the passive mixing and printing nozzle 1501 through the hose.

Further, the anti-settling feeding module I2 and the anti-settling feeding module II3 may be electric stirring pressure barrels and the like, and are connected to the feed ports of the vibrational mixing chamber 405 through hoses, hose couplers and the like. The anti-settling feeding module I2 is configured to place the printing material I. The printing material I is a first printing raw material, which includes, but not limited to, a photosensitive resin, PDMS, a hydrogel, a thermosetting epoxy resin, and other photocurable or thermocurable materials.

The anti-settling feeding module II3 is configured to place the printing material II. The printing material II is a uniformly mixed liquid of the first printing raw material and a second printing raw material. The second printing raw material includes, but not limited to, various micro-nano materials, such as powdery or particle materials of $SiO_2$, $Al_2O_3$, $TiO_2$, SiC, $ZrO_2$, graphene, carbon nanotubes or the like. The size of the micro-nano material is 30 nm-50 μm.

In this example, the constraining and sacrificial layer feeding module 1 is configured to place a printing material III. The printing material III is a third printing raw material. The third printing raw material includes, but not limited to, preferably various water-soluble materials, such as PVA.

Based on the above, the technical solutions of the embodiments of the invention are as follows:

(1) A three-stage material uniform mixing method is used to solve the problems of material agglomeration and non-uniform mixing, thereby realizing high-efficiency uniform mixing of two or more materials and printing of the continuous gradient material. First-stage mixing: The printing material II (a composite material obtained by uniformly mixing the first printing raw material and the second printing raw material) is first premixed thoroughly. The filler and the liquid matrix material are uniformly mixed thoroughly and completely by surface modification (to avoid agglomeration, especially severe agglomeration of the nano-scale filler and the high-solid-content filler), ultrasonic vibration, ball milling or the like.

Second-stage mixing: The second-stage mixing of the materials is realized through the screw, so that the printing material I and the printing material II are uniformly mixed continuously and stably in the vibrational mixing chamber 405. Third-stage mixing: The third-stage mixing of the materials is realized by vibration. The mixture is finally sent into the passive mixing nozzle to realize continuous and stable printing. Thus, after the materials undergo the multistage mixing, the printing material reaching the nozzle has better continuous functional gradient performance.

(2) The active mixing (screw extrusion+ultrasonic vibration) is introduced to solve the problems in manufacturing of functionally gradient materials from high-solid-content and high-viscosity materials. Meanwhile, the active mixing can effectively prevent the material from settling during the printing.

(3) The constraining and sacrificial layer structure is introduced. In the printing using the traditional materials and technique, whether the printing material is a single material or a composite material, the components and properties of the material remain basically unchanged, and the optimized technical parameters for printing are generally applicable throughout the printing process. However, in the printing process of the continuous functionally gradient materials/structures, the composition/components and the physical and chemical properties of the material change in real time, which brings a great challenge to printing. Therefore, the introduction of the constraining and sacrificial layer structure is proposed. This brings about the advantages and significant effects:

1) With the assistance of the constraining and sacrificial layer, the problems of poor printing stability and consistency, that are caused by constant changes in the composition/components and the physical and chemical properties of the material in the printing process of the continuous functionally gradient materials/structures, are solved. The technical parameters for printing have a wide process window, which can ensure the printing resolution, geometric shape, surface quality and continuous gradient performance.

2) The constraining and sacrificial layer structure is used to assist in forming any complex functionally gradient three-dimensional structure. Since the current printed layer is not fully cured, it is difficult to achieve precise control of the geometric shape without the assistance of the constraining and sacrificial layer. The constraining and sacrificial layer assists in maintaining the geometric shape of the formed layer that has not been full cured. Moreover, the constraining and sacrificial layer can assist in precise formation of low-viscosity photosensitive resin materials, and assist in forming complex internal structures, overhanging structures, thin-walled structures, undercut structures, etc.

3) The printing resolution and consistency are improved. The optimized process window is applicable within a very wide range. The use of the constraining and sacrificial layer structure can ensure the thickness of each layer of the printed functionally gradient material/structure to be the set thickness. Whether in the functionally gradient region with low filler content or the functionally gradient region with high filler content in the printed single functionally gradient member (product), the use of the constraining and sacrificial layer structure can ensure the layers to have the same thickness (or set variable thickness or adaptive thickness). Especially for different regions of the same printed member, and printed members in the same batch and different batches, the use of the constraining and sacrificial layer structure can ensure the printed functionally gradient members (products) to have good consistency.

Example 2

Figure 9:
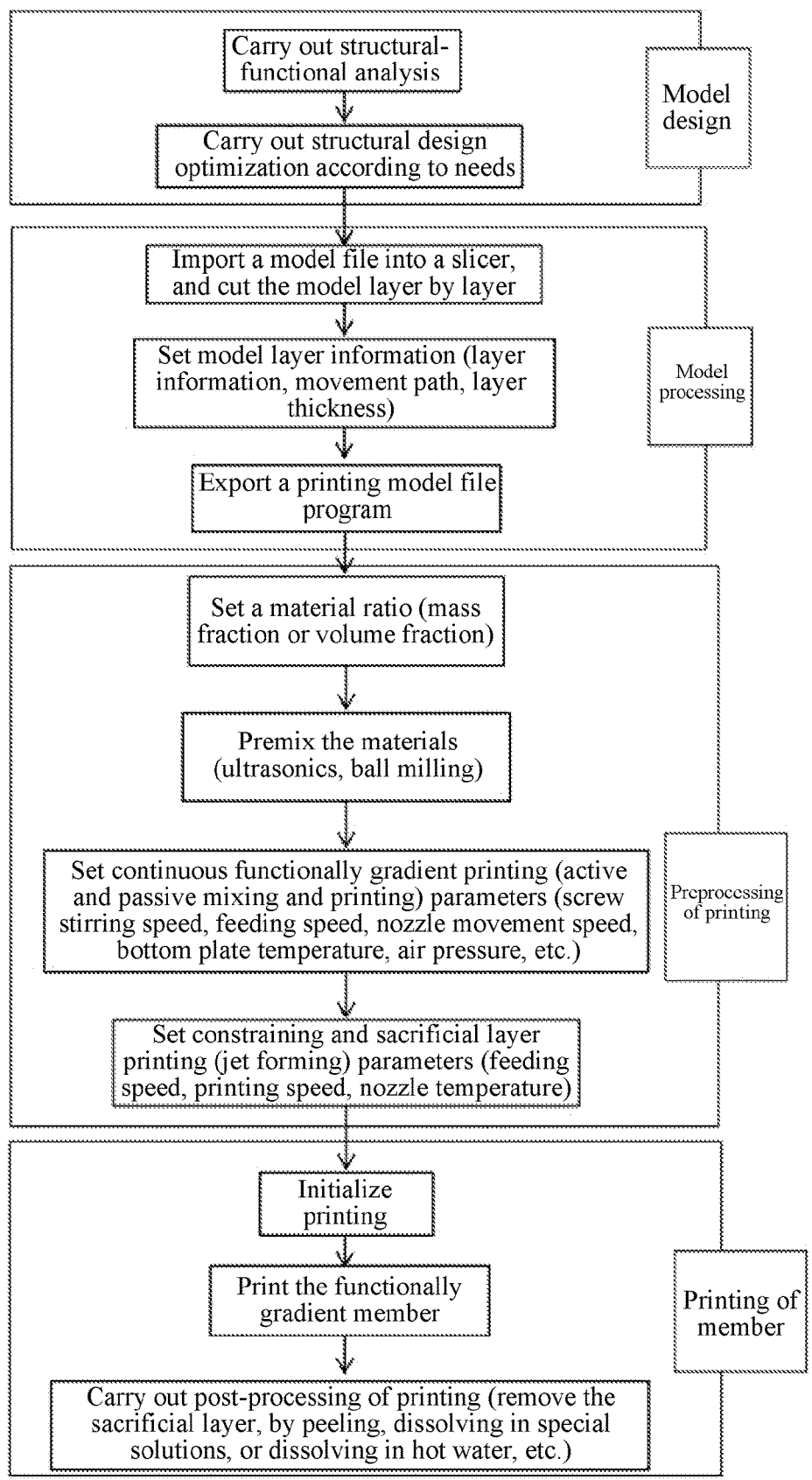
FIG. 9 is a flow chart in a case where the constraining and sacrificial layer is printed by the material extrusion or spray forming technique according to one or more embodiments of the invention.

This example provides a 3D printing method for integrated manufacturing of functionally gradient materials and three-dimensional structures, which uses the 3D printing device of Example I. The constraining and sacrificial layer is printed by a material jet forming technique. As shown in FIG. 9, the method includes:

(1) Model setting: The geometric structure of the printed part is determined.

(2) Model information processing: Geometric information (path, thickness, etc.) of each layer is determined, and a printing data file is generated.

(3) Preprocessing of printing: Preparations before printing are completed. The material ratio is determined, and the printing material I and the printing material II are respectively preprocessed. The feeding speed, the printing speed, the bottom plate temperature, the nozzle temperature, the air pressure, the voltage and the like are set.

(4) Printing of functionally gradient structure: Under the cooperation of the passive mixing and printing nozzle 1501 and the constraining and sacrificial layer printing nozzle 1801, the materials are fed and jetted according to the ratio. The sacrificial layer is printed first, and then the functionally gradient structure layer is printed, thereby forming the geometric shape.

(5) After the printing of each layer is completed, the Z-axis ascends by the height of the thickness of one layer, and then the printing of the structure of the next layer is completed. The above process is repeated until the printing of the structures of all the layers is completed.

(6) Postprocessing of printing: All the units and modules are shut down. The formed functionally gradient structural member containing the assistant supporting structure that has been printed is removed, and then the assistant supporting structure is separated from the functionally gradient member sample (by peeling, dissolving in special solutions, dissolving in hot water or the like).

For the printed functionally gradient structure, multiple layers may be set to have the same material information according to actual printing needs (printing efficiency and actual printing requirements or resolution requirements).

In this example, by taking a photosensitive resin RGD835/$Al_2O_3$ functionally gradient ceramic insulator as an example, a working method of integrated manufacturing of continuous functionally gradient materials and complex three-dimensional structures is realized, and specific process steps are described as follows:

Step 1: Preparation of printing data file: According to the structural requirements of the printed member, it is determined that the $Al_2O_3$ concentration in the ceramic insulator changes continuously from 0% to 50% from one side to the other side, and the printing information of each layer is determined. The constraining and sacrificial layer printing nozzle 180107 adopts a Musashi nozzle having an inner diameter of 250 μm, the printing height is 0.1 mm, and the line spacing is set to 100 μm. The passive mixing and printing nozzle 150104 adopts a metal stainless steel nozzle (Model 21G, having an outer diameter of 810 μm and an inner diameter of 510 μm), the printing height is 0.05 mm, and the line spacing is 300 μm.

Step 2: Preprocessing of Printing:

(2-1) Printing of constraining and sacrificial layer: The printing material of the constraining and sacrificial layer is preferably water-soluble PVA. The printing material is put into the constraining and sacrificial layer feeding module 1. The cartridge in the constraining and sacrificial layer feeding module 1 may be heated. The printing material is fed to the constraining and sacrificial layer storage vat 180105 through the heatable pipe and the adapter. Then, by utilizing the positive pressure of the air passage and the high voltage DC power supply 13, the nozzle and the substrate placed on the printing platform 17 form a strong electric field, which drives the printing material to be jetted and deposited from the Musashi nozzle.

(2-2) Active and passive mixing and printing: A pure solution of the photosensitive resin RGD835 is the printing material I. Fabrication of variable-component printing solution: A photosensitive resin RGD835/$Al_2O_3$ mixed solution with an $Al_2O_3$ content of 50% is prepared by ultrasound and a ball grinder such that the $Al_2O_3$ particles are uniformly dispersed in the photosensitive resin RGD835 solution, and then the mixed solution is vacuumized to obtain the high-concentration photosensitive resin RGD835/$Al_2O_3$ mixed solution, that is the printing material II. The printing material I (pure photosensitive resin RGD835) and the printing material II (photosensitive resin RGD835/$Al_2O_3$ mixed solution with an $Al_2O_3$ content of 50%) are respectively placed in the anti-settling feeding module I2 and the anti-settling feeding module II3. Then, the printing material I and the printing material II are uniformly stirred by the active stirring screw 406 and vibrated in the vibrational mixing chamber 405, and then sent into the static mixer 150103. The material in the static mixer 150103 is stably and uniformly sent to the printing nozzle by using the positive pressure air passage 12 and the high voltage DC power supply 13. The uniformly mixed printing material is extruded from the stainless steel nozzle.

(2-3) The heating temperature of the printing platform 17 is set to 80° C. The cartridge in the constraining and sacrificial layer feeding module 1, the heatable pipe, the constraining and sacrificial layer nozzle heating block 180106 and the ring heater 180104 are heated to 200° C. The UV curing module 19, the auxiliary observation camera module 14 and the high voltage DC power supply 13 are in a standby state. The passive mixing and printing nozzle and the constraining and sacrificial layer printing nozzle 1801 are enabled to move to the printing station IIA and be in a standby state, and the movement platforms are in an enabled state. Thus, the entire preprinting preparation is completed.

Step 3: Printing of Continuous Functionally Gradient Structure: (3-1) Feeding: Based on the printing data information of each layer and program information, the feeding speed and the feeding time are set, and the printing material PVA of the constraining and sacrificial layer is fed to the constraining and sacrificial layer storage vat 180105. According to the material requirements and material ratio, the feeding speed and time of the feeding modules are accurately set. The printing material I and the printing material II are fed to the active mixing module 4 (according to the volume ratio or weight ratio), mixed, and then sent to the passive mixing and printing nozzle 1501.

(3-2) Printing of constraining and sacrificial layer: The constraining and sacrificial layer printing material PVA (printing material III) is fed to the constraining and sacrificial layer storage vat 180105 by the constraining and sacrificial layer feeding module 1. Then, the cylinder module III1803 drives the constraining and sacrificial layer printing nozzle 1801 to descend to the printing station IIB. The air pressure regulator with gauge 5 for printing the constraining and sacrificial layer is used to precisely regulate the pressure of the air passage (positive pressure 50 kPa). The printing material is fed to the constraining and sacrificial layer storage vat 180105. The high voltage DC power supply 13 is turned on, and the voltage value is adjusted to 1500 V, so that the nozzle and the substrate placed on the printing platform 17 form a strong electric field, which draws the printing material out of the Musashi nozzle. Thus, the constraining and sacrificial layer of the member is printed according to the set path of the program. After the printing of the constraining and sacrificial layer is completed, the cylinder module II1803 drives the constraining and sacrificial layer printing nozzle 1801 to ascend to the initial printing station IIC (original position).

(3-3) Printing of functionally gradient layer: The printing material I and the printing material II are fed into the active mixing module 4 by the anti-settling feeding module I2 and the anti-settling feeding module II3 and mixed by the active mixing module 4. The mixed material is sent into the static mixer 150103 from the discharge port 404 of the active mixing module through a hose. Then, an air pressure regulator with gauge II6 is used to precisely regulate the pressure of the air passage (positive pressure 10 kPa). The printing material is fed to the passive mixing and printing nozzle 150104. The high voltage DC power supply 13 is turned on, and the voltage value is adjusted to 800 V, so that the nozzle and the substrate placed on the printing platform 17 form a strong electric field, which draws the printing material out of the stainless steel nozzle. Thus, the functionally gradient layer material is printed in the constraining and sacrificial layer according to the set path of the program. After the printing of the functionally gradient layer is completed, the cylinder module I1503 drives the passive mixing and printing nozzle 1501 to ascend to the initial printing station I C (original position).

(3-4) According to the printing needs, the passive mixing and printing nozzle 1501 and the constraining and sacrificial layer printing nozzle 1801 cooperate to alternately spray the printing materials according to the set technical parameters, printing path and printing order of the printing program. The XYZ three-axis module is driven to move according to the geometric information. The sacrificial layer is printed first, and then the functionally gradient structure layer is printed, thereby forming the geometric shape.

Step 4: Every time after the constraining and sacrificial layer printing nozzle finishes printing one layer, the Z-axis movement module ascends by a height of 0.1 mm. Every time the passive mixing and printing nozzle finishes printing one layer, the Z-axis movement module ascends by a height of 0.05 mm, and the UV curing unit 1901 is started. The UV curing unit 1901 is controlled to move to the printing station IIIA. The UV curing unit 1901 is driven by the cylinder module 1903 to descend to the printing station IIIB to cure the mixed solution of this layer for 20 s such that the material of this printed layer is cured by about 90%. After the precuring, the cylinder module 1903 drives the UV curing unit 1901 to ascend to the initial printing station III C (original position). After the printing of a second layer of the mixed solution is finished, curing is carried out by the UV curing unit 1901 for 20 s, so that the printing material of the previous layer is fully cured and the material of the current layer is cured by about 90%. As the number of layers increases, the feeding speeds of the anti-settling feeding module I2 and the anti-settling feeding module II3 are changed such that the $Al_2O_3$ concentration changes continuously.

Step 5: The above operations are repeated until the whole printing process is completed.

Step 6: Postprocessing of Printing:

(6-1) After the printing is completed, the constraining and sacrificial layer feeding module 1, the anti-settling feeding module I2 and the anti-settling feeding module II3 are turned off, the heating function of the constraining and sacrificial layer nozzle heating block 180106, the ring heater 180104 and the printing platform 17 is deactivated, the high voltage DC power supply 13 is turned off, the UV curing unit 1901 is turned off, the active mixing module 4 is turned off, and the passive mixing and printing nozzle 1501, the constraining and sacrificial layer printing nozzle 1801 and the UV curing unit 1901 are enabled to return to the initial printing positions of the platform.

(6-2) The photosensitive resin RGD835/$Al_2O_3$ functionally gradient ceramic insulator part containing the PVA constraining and sacrificial layer that has been printed is removed from the printing platform 17, and postcured in the UV curing oven, thereby further realizing full curing and increasing the yield of the product.

(6-3) Removal of constraining and sacrificial layer: The whole part is put in warm water such that the PVA constraining and sacrificial layer is separated from the functionally gradient member sample, thereby obtaining the finished functionally gradient member. If the constraining and sacrificial layer material is a water-soluble material, the constraining and sacrificial layer is first peeled manually, and then completely removed in 40-70° C. hot water. If the constraining and sacrificial layer material is a special material such as HIPS, the constraining and sacrificial layer is removed mainly by being dissolved in a limonene solution.

In this example, a two-step curing strategy is introduced, which can effectively enhance the printing efficiency and improve the interlayer bonding strength and continuous gradient performance of the functionally gradient member (product) with the assistance of the constraining and sacrificial layer structure. The specific method is as follows: during the printing of each layer, the printed layer (formed structure layer) is not fully cured (i.e. precured); and after the printing of the current layer is completed, the precured printed layer is fully cured, and the current layer is precured. The introduction of the two-step curing technique can realize precise control of interlayer bonding strength and gradient performance. Therefore, the problems of poor interlayer bonding strength, poor continuous gradient performance and poor resolution in the prior art are solved.

Example 3

Figure 6:
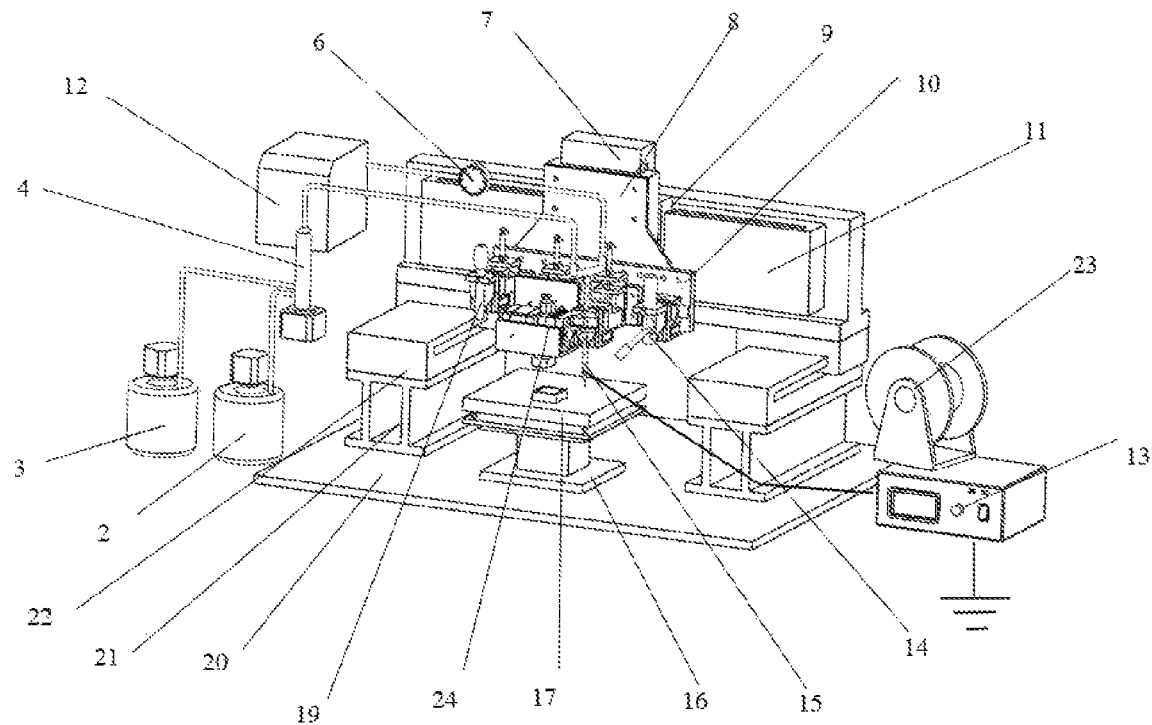
FIG. 6 is a schematic structural diagram of a printing device in a case where the constraining and sacrificial layer is printed by a traditional FDM printing technique according to one or more embodiments of the invention.
Figure 7:
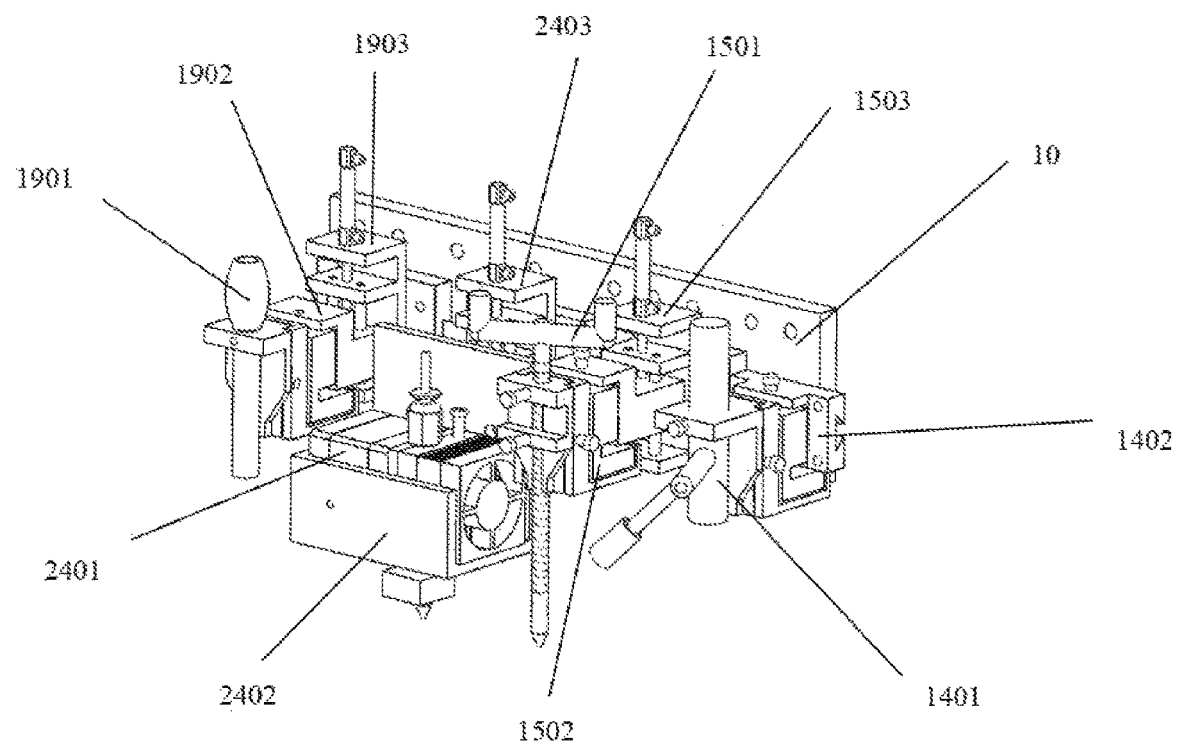
FIG. 7 is a schematic diagram of printing in a case where the constraining and sacrificial layer is printed by the traditional FDM technique according to one or more embodiments of the invention.
Figure 8:
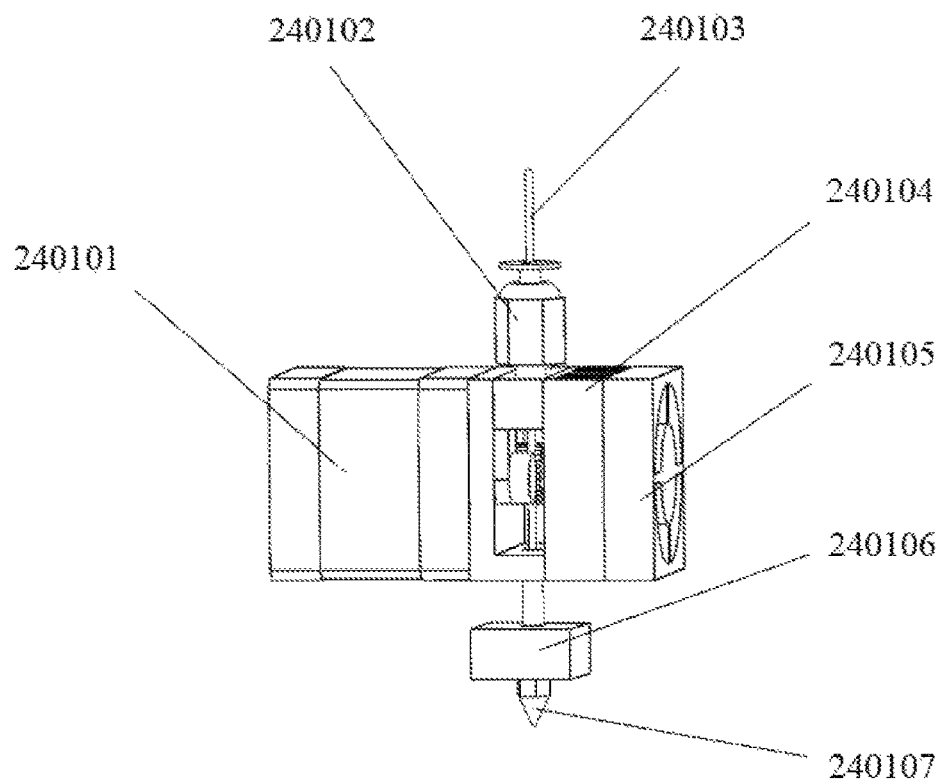
FIG. 8 is a schematic structural diagram of a constraining and sacrificial layer printing nozzle in a case where the constraining and sacrificial layer is printed by the traditional FDM printing technique according to one or more embodiments of the invention.

This example provides a 3D printing device for integrated manufacturing of functionally gradient materials and three-dimensional structures, as shown in FIG. 6 to FIG. 8, including an XYZ three-axis module, an anti-settling feeding module I2 (in which high-solid-content materials do no settle after long-time storage), an anti-settling feeding module II3 (in which high-solid-content materials do no settle after long-time storage), an active mixing module 4, a positive pressure air passage 12, a high voltage DC power supply 13, an auxiliary observation camera module 14, a passive mixing and printing module 15, an FDM printing module 24, an FDM filament feeding module 23, a UV curing module 19, a bottom plate 20, a printing platform 17, a base 16, etc.

This example is different from Example I in that: the constraining and sacrificial layer printing module 18 in Example I is replaced with the FDM printing module 24, and the FDM printing module 24 is connected to the FDM filament feeding module 23. A printing material III is placed in the FDM filament feeding module 23. The printing material III is ABS, PLA, TUP, etc., which are commonly used in FDM. In this example, the FDM printing material is PLA. The FDM filament feeding module 23 feeds a filament (thermoplastic filament-like material) 240103 into the FDM printing module 24.

Further, as shown in FIG. 7 and FIG. 8, the FDM printing module 24 includes an FDM printing nozzle 2401, a connecting rack VIII 2402 and a cylinder module IV 2403. The FDM printing nozzle 2401 is connected to the cylinder module IV 2403 through the connecting rack VIII 2402, and the cylinder module IV 2403 is mounted on a side surface of the connecting rack II10.

The FDM printing nozzle 2401 includes a stepping motor 240101, a filament feeding port 240102, radiating fins 240104, a radiator fan 240105, an FDM nozzle heating block 240106 and an FDM printing nozzle 240107. The filament feeding port 240102 is used for the filament 240103 to pass through. The stepping motor 240101 is configured to provide feeding power for the filament 240103. The FDM nozzle heating block 240106 is mounted above the FDM printing nozzle 240107 and configured to melt the filament 240103.

The stepping motor 240101 drives the FDM filament feeding module 23 to feed the prepared printing material into the FDM printing nozzle 240107 of the FDM filament feeding module 24 through the filament feeding port 240102. Under the action of the FDM nozzle heating block 240106, the printing material is melted into a semi-liquid, and the molten printing material is extruded out. The FDM printing module 24 works continuously and may be at high temperature for a long time, so the radiating fins 240104 and the radiator fan 240105 are required to cool the stepping motor 240101 and the entire FDM printing module 24.

Example 4

Figure 10:
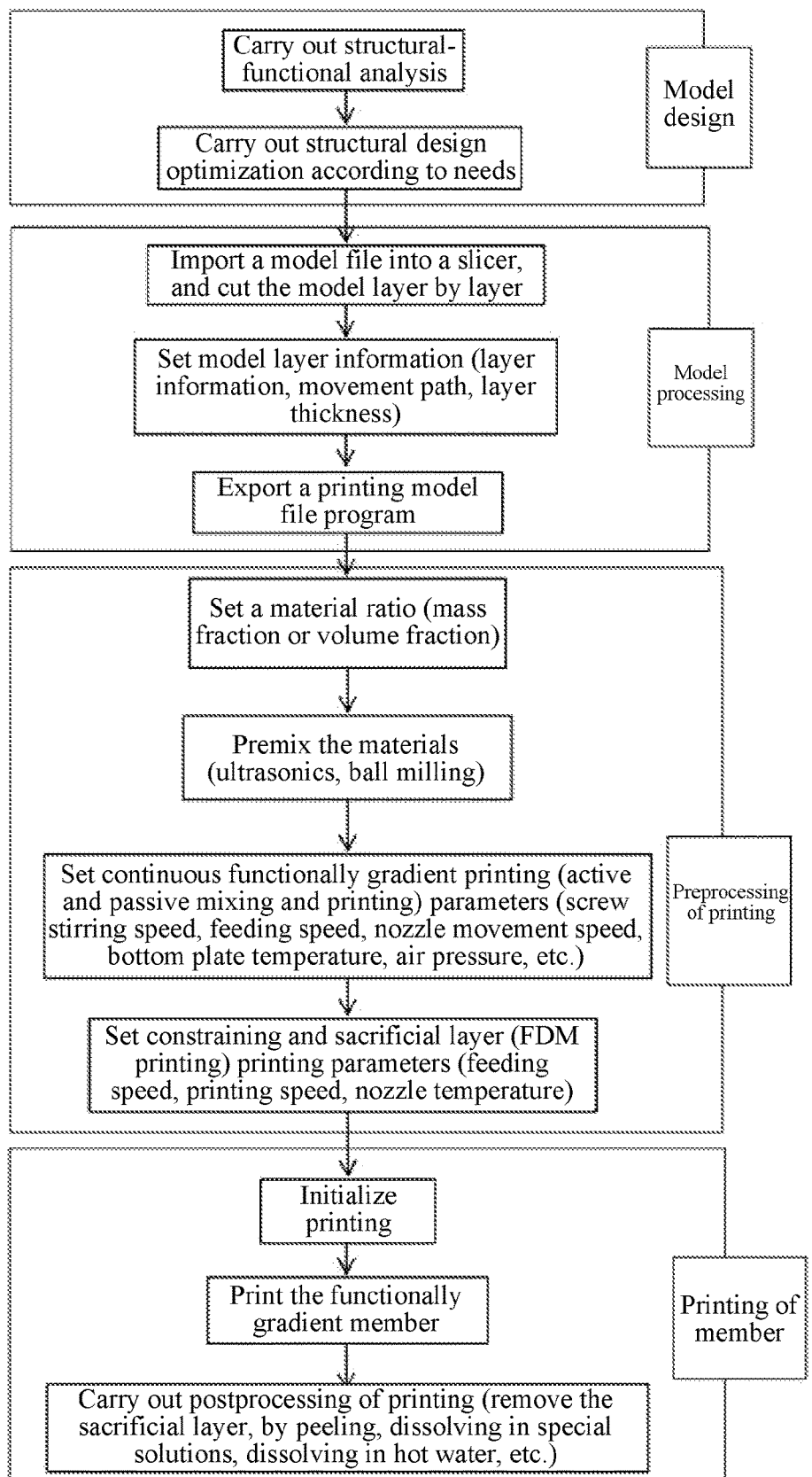
FIG. 10 is a flow chart in a case where the constraining and sacrificial layer is printed by the traditional FDM printing technique according to one or more embodiments of the invention.

This example provides a 3D printing method for integrated manufacturing of functionally gradient materials and three-dimensional structures, which uses the 3D printing device of Example III. The constraining and sacrificial layer is printed by a traditional FDM printing technique. As shown in FIG. 10, the method includes:

(1) Model setting: The geometric structure of the printed part is determined.

(2) Model information processing: Geometric information (path, thickness, etc.) of each layer is determined, and a printing data file is generated.

(3) Preprocessing of printing: Preparations before printing are completed. Fabrications before printing are completed. The material ratio is determined, and the printing material I and the printing material II are preprocessed. The printing speed, the temperatures, the air pressure, the voltage and the like of the functionally gradient material set. The feeding speed (speed of the stepping motor 240101), the printing speed, the nozzle temperature and the like of the FDM printing module are set.

(4) Printing of functionally gradient structure: Under the cooperation of the passive mixing and printing nozzle 1501 and the FDM printing nozzle 2401, the materials are fed and extruded according to the ratio. The sacrificial layer is printed first, and then the functionally gradient structure layer is printed, thereby forming the geometric shape.

(5) After the printing of each layer is completed, the Z-axis ascends by the height of the thickness of one layer, and then the printing of the structure of the next layer is completed. The above process is repeated until the printing of the structures of all the layers is completed.

(6) Postprocessing of printing: All the units and modules are shut down. The formed functionally gradient structural member containing the assistant supporting structure that has been printed is removed, and then the assistant supporting structure is separated from the functionally gradient member sample (by peeling, dissolving in special solutions, dissolving in hot water or the like).

For the printed functionally gradient structure, multiple layers may be set to have the same material information according to actual printing needs (printing efficiency and actual printing requirements or resolution requirements).

In this example, by taking a functionally gradient thermal interface of a 1 μm BN/PDMS mixed solution and a 20 μm BN/PDMS mixed solution as an example, a working method of integrated manufacturing of continuous functionally gradient materials and complex three-dimensional structures is realized, and specific process steps are described as follows:

Step 1: Preparation of printing data file: According to the structural requirements of the printed member, it is determined that the concentration of the functionally gradient thermal interface continuously changes from the BN/PDMS mixed solution with a 1 μm BN content of 40%, through the BN/PDMS mixed solution with a 20 μm BN content of 40%, to the BN/PDMS mixed solution with a 1 μm BN content of 40% from one side to the other side, and the printing information of each layer is determined. The FDM printing nozzle 240107 has an inner diameter of 400 μm, the printing height is 0.2 mm, and the line spacing is 350 μm. The passive mixing and printing nozzle 150104 adopts a metal stainless steel nozzle (Model 21G, having an outer diameter of 810 μm and an inner diameter of 510 μm), the printing height is 0.2 mm, and the line spacing is 300 μm.

Step 2: Preprocessing of Printing:

(2-1) FDM printing: The FDM printing material is thermoplastic PLA. The printing material is put into the FDM filament feeding module 23 and sent to the FDM printing nozzle 2401 through the filament feeding port 240102. Under the action of the FDM nozzle heating block 240106, the printing material is melted into a semi-liquid, which is then extruded out.

(2-2) Active and passive mixing and printing: After a PDMS elastomer and a curing agent are mixed in a ratio of 20:1, the BN/PDMS mixed solution with a 1 μm BN content of 40% is prepared by ultrasonic vibration. The mixed solution is stirred and mixed such that the BN particles are uniformly dispersed in the PDMS solution. Then, the mixed solution is vacuumized to obtain the BN/PDMS mixed solution with a 1 μm BN content of 40%, which is the printing material I. Next, the other printing solution is prepared: after the PDMS elastomer and the curing agent are mixed in a ratio of 5:1, the BN/PDMS mixed solution with a 20 μm BN content of 40% is prepared by ultrasonic vibration. The mixed solution is stirred and mixed such that the BN particles are uniformly dispersed in the PDMS solution. Then, the mixed solution is vacuumized to obtain the BN/PDMS mixed solution with a 20 μm BN content of 40%, which is the printing material II.

The printing material I (the BN/PDMS mixed solution with a 1 μm BN content of 40%) and the printing material II (the BN/PDMS mixed solution with a 20 μm BN content of 40%) are respectively placed in the anti-settling feeding module I2 and the anti-settling feeding module II3. Then the printing material I and the printing material II are uniformly stirred by the screw and vibrated in the vibrational mixing chamber 405, and sent into the static mixer. The material in the static mixer is stably and uniformly sent to the printing nozzle by using the positive pressure air passage 12 and the high voltage DC power supply 13. The uniformly mixed printing material is extruded from the stainless steel nozzle.

(2-3) The heating temperature of the printing platform 17 is set to 80° C. The FDM nozzle heating block 240106 is heated to 200° C. The radiator fan 240105, the UV curing module 19, the auxiliary observation camera module 14 and the high voltage DC power supply 13 are in a standby state. The passive mixing and printing nozzle 1501 and the FDM printing nozzle 2401 are enabled to move to the printing station IIA and be in a standby state, and the movement platforms are in an enabled state. Thus, the entire preprinting preparation is completed.

Step 3: Printing of Continuous Functionally Gradient Structure:

(3-1) Feeding: Based on the printing data information of each layer and program information, the filament feeding speed (speed of the stepping motor 240101) and the filament feeding time are set, and the FDM printing filament PLA is fed to the FDM printing nozzle through the filament feeding port. According to the material requirements and material ratio, the feeding speed and time of the feeding modules are accurately set. The printing material I and the printing material II are fed to the active mixing module 4 (according to the volume ratio or weight ratio), mixed, and then sent to the passive mixing and printing nozzle.

(3-2) Printing of constraining and sacrificial layer: The FDM printing filament PLA is fed to the FDM printing nozzle 2401 by the FDM filament feeding module 23 through the filament feeding port 240102. Then, the cylinder module IV 2403 drives the FDM printing nozzle 2401 to descend to the printing station IIB, and the printing filament is extruded out from the FDM printing nozzle 240107. Thus, the constraining and sacrificial layer of the member is printed according to the set path of the program. After the printing of the constraining and sacrificial layer is completed, the cylinder module IV 2403 drives the FDM printing nozzle 2401 to ascend to the initial printing station IIC (original position).

(3-3) Printing of functionally gradient layer: The printing material I and the printing material II are fed into the active mixing module 4 by the anti-settling feeding module I2 and the anti-settling feeding module II3 and mixed by the active mixing module. The uniformly mixed material is sent into the passive mixing and printing module 15 and then into the static mixer 150103. Then, an air pressure regulator with gauge 116 is used to precisely regulate the pressure of the air passage (positive pressure 30 kPa). The uniformly mixed printing material is fed to the passive mixing and printing nozzle 150104. The high voltage DC power supply 13 is turned on, and the voltage value is adjusted to 1200 V, so that the nozzle and the substrate placed on the printing platform 17 form a strong electric field, which draws the printing material out of the stainless steel nozzle. Thus, the functionally gradient member is printed according to the set path of the program. After the printing of the functionally gradient layer is completed, the cylinder module II503 drives the passive mixing and printing nozzle 1501 to ascend to the initial printing station I C (original position).

(3-4) According to the printing needs, the passive mixing and printing nozzle 1501 and the FDM printing nozzle 2401 cooperate to alternately spray the printing materials according to the set technical parameters, printing path and printing order of the printing program. The XYZ three-axis module is driven to move according to the geometric information. The sacrificial layer is printed first, and then the functionally gradient structure layer is printed, thereby forming the geometric shape.

Step 4: Every time after the constraining and sacrificial layer printing nozzle finishes printing one layer, the Z-axis movement module ascends by a height of 0.2 mm. Every time the passive mixing and printing nozzle finishes printing one layer, the Z-axis movement module ascends by a height of 0.2 mm, and curing is carried out for 30 s by using the temperature of the printing platform 17, so that the material of this layer is cured by about 80%. After the printing of a second layer of the mixed solution is finished, curing is carried out for 30 s by using the temperature of the printing platform 17, so that the printing material of the previous layer is fully cured and the material of the current layer is cured by about 80%. In the printing process, as the number of layers increases, the temperature of the printing platform 17 should be increased appropriately. Moreover, as the structure is printed to an appropriate height, the UV curing unit 1901 above is started to cure the top of the structure. As the number of layers increases, the feeding speeds of the anti-settling feeding module I2 and the anti-settling feeding module II3 are changed such that the BN concentration changes continuously.

Step 5: The above operations are repeated until the whole printing process is completed.

Step 6: Postprocessing:

(6-1) After the printing is completed, the stepping motor 240101, the anti-settling feeding module I2, the anti-settling feeding module II3 and the active mixing module 4 are turned off, the heating function of the FDM nozzle heating block 240106 and the printing platform 17 is deactivated, the high voltage DC power supply 13 is turned off, the UV curing unit 1901 is turned off, and the passive mixing and printing nozzle 1501, the FDM printing nozzle 2401 and the UV curing unit 1901 are enabled to return to the initial printing positions of the platform.

(6-2) The functionally gradient thermal interface part of the 1 μm BN/PDMS mixed solution and the 20 μm BN/PDMS mixed solution containing the PVA constraining and sacrificial layer that has been printed is removed from the printing platform 17, and postcured in the vacuum oven (120° C.), thereby further realizing full curing and increasing the yield of the product.

(6-3) Removal of constraining and sacrificial layer: The constraining and sacrificial layer is removed mainly by manual peeling, such that the PLA constraining and sacrificial layer is separated from the functionally gradient member sample, thereby obtaining the finished functionally gradient member. If the constraining and sacrificial layer material is ABS or PLA, the constraining and sacrificial layer is removed mainly by manual peeling and optionally assisted by ultrasound and other treatment methods, but the principle of not destroying the functionally gradient member should be followed.

The foregoing descriptions are merely preferred embodiments of this application, but are not intended to limit this application. Any modification, equivalent replacement, or improvement made without departing from the spirit and principle of this application should fall within the protection scope of this application.

What is claimed is:

1. A 3D printing device capable of integrating functions of preparing functionally gradient materials and manufacturing three-dimensional structures, comprising an active mixing module, a passive mixing and printing module and a constraining and sacrificial layer printing module, wherein an input end of the active mixing module is connected to a plurality of anti-settling feeding modules such that a plurality of materials are actively mixed uniformly; an output end of the active mixing module is connected to the passive mixing and printing module such that the actively mixed materials are input into the passive mixing and printing module and subjected to static mixing;

the passive mixing and printing module and the constraining and sacrificial layer printing module are mounted on one side of an XYZ three-axis module; the constraining and sacrificial layer printing module is connected to a constraining and sacrificial layer feeding module and is capable of printing and forming a complex functionally gradient three-dimensional structure with the assistance of a constraining and sacrificial layer material;

wherein the active mixing module comprises a vibrational mixing chamber and an active stirring screw mounted in the vibrational mixing chamber, and the vibrational mixing chamber is capable of ultrasonic vibration; the plurality of materials entering the active mixing module are uniformly mixed under the actions of the ultrasonic vibration and the stirring of the active stirring screw and extruded by the active stirring screw; and the passive mixing and printing module comprises a passive mixing and printing nozzle and a cylinder module I capable of driving the passive mixing and printing nozzle to move up and down; and the constraining and sacrificial layer printing module comprises a constraining and sacrificial layer printing nozzle and a cylinder module II capable of driving the constraining and sacrificial layer printing nozzle to move up and down.

2. A 3D printing device capable of integrating functions of preparing functionally gradient materials and manufacturing three-dimensional structures, comprising an active mixing module, a passive mixing and printing module and an FDM printing module, wherein an input end of the active mixing module is connected to a plurality of anti-settling feeding modules such that a plurality of materials are actively mixed uniformly; an output end of the active mixing module is connected to the passive mixing and printing module such that the actively mixed materials are input into the passive mixing and printing module and subjected to static mixing;

the passive mixing and printing module and the FDM printing module are mounted on one side of an XYZ three-axis module; the FDM printing module is connected to an FDM filament feeding module, and the FDM filament feeding module is capable of feeding a filament into the FDM printing module;

the active mixing module comprises a vibrational mixing chamber and an active stirring screw mounted in the vibrational mixing chamber, and the vibrational mixing chamber is capable of ultrasonic vibration; the plurality of materials entering the active mixing module are uniformly mixed under the actions of the ultrasonic vibration and the stirring of the active stirring screw and extruded by the active stirring screw; and the passive mixing and printing module comprises a passive mixing and printing nozzle and a cylinder module I capable of driving the passive mixing and printing nozzle to move up and down; and the FDM printing module comprises an FDM printing nozzle and a cylinder module IV capable of driving the FDM printing nozzle to move up and down.

3. The 3D printing device according to claim 1, wherein the active stirring screw is connected to a stepping motor, and the active stirring screw is mounted along an axial direction inside the vibrational mixing chamber; one end of the vibrational mixing chamber is provided with a discharge port, and the discharge port is connected to the passive mixing and printing nozzle; and a side surface of the vibrational mixing chamber is provided with a plurality of feed ports configured to be connected to the plurality of anti-settling feeding modules.

4. The 3D printing device according to claim 3, wherein the side surface of the vibrational mixing chamber is provided with a feed port I and a feed port II, the feed port I is connected to an anti-settling feeding module I of the plurality of anti-settling feed modules, and the feed port II is connected to an anti-settling feeding module II of the plurality of anti-settling feeding modules; and the anti-settling feeding module I is configured to place a printing material I, the printing material I is a first printing raw material, and the first printing raw material is a photocurable or thermocurable material; the anti-settling feeding module II is configured to place a printing material II, and the printing material II is a uniformly mixed liquid of the first printing raw material and a second printing raw material; and the second printing raw material is a micro-nano material.

5. The 3D printing device according to claim 1, wherein the passive mixing and printing nozzle comprises a static mixer and a passive mixing and printing nozzle, the passive mixing and printing nozzle is mounted at one end of the static mixer, and the other end of the static mixer is connected to a passive mixing feed port and a passive mixing positive pressure air port; and the passive mixing feed port is connected to the active mixing module through a hose, and the passive mixing positive pressure air port is connected to a positive pressure air passage through a hose; and the passive mixing and printing nozzle is connected to a positive electrode of a high voltage DC power supply.

6. The 3D printing device according to claim 1, wherein the constraining and sacrificial layer printing nozzle comprises a constraining and sacrificial layer storage vat, one end of the constraining and sacrificial layer storage vat is provided with a constraining and sacrificial layer nozzle heating block and a constraining and sacrificial layer printing nozzle, the other end of the constraining and sacrificial layer storage vat is provided with an adapter, and the constraining and sacrificial layer storage vat is connected to a constraining and sacrificial layer feed port and a constraining and sacrificial layer positive pressure air port through the adapter; and the constraining and sacrificial layer printing nozzle is connected to a positive electrode of a high voltage DC power supply.

7. The 3D printing device according to claim 1, further comprising a UV curing module and an auxiliary observation camera module mounted on the XYZ three-axis module, wherein the UV curing module comprises a UV curing unit and a cylinder module III capable of driving the UV curing unit to move up and down.

8. The 3D printing device according to claim 1, wherein a printing platform for placing a substrate is disposed below the passive mixing and printing nozzle, the printing platform is mounted above a bottom plate through a base, the printing platform is provided with a heater, and the printing platform can be levelable.

9. A method for integrally preparing functionally gradient materials and manufacturing three-dimensional structures using the 3D printing device according to claim 1, comprising:

step 1: preprocessing of printing:
placing a first printing raw material as a printing material I into an anti-settling feeding module I, placing a printing material II prepared by uniformly mixing the first printing raw material with a second printing raw material according to design requirements into an anti-settling feeding module II, and placing a third printing raw material as a printing material III into a constraining and sacrificial layer feeding module; and
heating a printing platform to a set temperature, enabling the constraining and sacrificial layer printing nozzle and a passive mixing and printing nozzle to move to a printing station IIA and the other modules to be in a printing enabled state;

step 2: printing of constraining and sacrificial layer:
enabling a cylinder module II to drive the constraining and sacrificial layer printing nozzle to descend to a printing station IIB, turning on the constraining and sacrificial layer feeding module, and using the constraining and sacrificial layer printing nozzle to complete printing of a restraining layer and a supporting structure according to a set path;

step 3: printing of functionally gradient layer:
moving the passive mixing and printing nozzle to a printing station IA, and enabling the cylinder module II to drive the passive mixing and printing nozzle to descend to a printing station IB; enabling the anti-settling feeding module I and the anti-settling feeding module II to respectively feed the materials to a vibrational mixing chamber in an active mixing module according to a set gradient ratio such that the materials that are mixed by stirring of the active stirring screw and vibration in the active mixing module are further uniformly mixed by a static mixer; and enabling a functionally gradient material to be extruded to a printing nozzle discharge port under the control of an extrusion force of a positive pressure control unit to complete printing of the functionally gradient layer according to a set path; wherein the printed functionally gradient layer material is within the constraining and sacrificial layer;

step 4: curing of functionally gradient layer:
moving a UV curing unit to a printing station IIIA, and enabling the cylinder module III to drive the UV curing unit to descend to a printing station IIIB; precuring the printed functionally gradient layer according to set time by UV-photocuring or thermocuring; after the functionally gradient layer is precured, and enabling the cylinder module III to drive the UV curing unit to ascend to an initial printing station III C;

step 5: repeating operations of steps 2-4 until the printing of all functionally gradient layer structures is completed;
wherein after the printing of the current functionally gradient layer is completed, curing is carried out, where the previous precured functionally gradient layer is fully cured, and the current functionally gradient layer is precured; and step 6: post-processing of printing:
after the printing of all the functionally gradient layers is completed, turning off the anti-settling feeding module I, the anti-settling feeding module II, and the constraining and sacrificial layer module; enabling the active mixing module, the passive mixing and printing nozzle, the constraining and sacrificial layer printing nozzle, and the UV curing unit to return to the initial stations; deactivating the heating function of the printing platform; closing a positive pressure air passage and turning off a high voltage DC power supply; and
removing the printed functionally gradient member from the printing platform, and postcuring the functionally gradient member in a UV curing oven or a vacuum oven; and removing the constraining and sacrificial layer to obtain the finished functionally gradient member (product).

10. The method according to claim 9, wherein in step 2, if the printed restraint layer and the supporting structure are micro-scale, a material jet printing mode is adopted; if the printed structure is meso-scale and macro-scale, a material extrusion printing mode is adopted; and
in step 3, if the printed functionally gradient layer structure is micro-scale, the material jet printing mode is adopted; and if the printed structure is meso-scale and macro-scale, the material extrusion printing mode is adopted.

11. The 3D printing device according to claim 2, wherein the active stirring screw is connected to a stepping motor, and the active stirring screw is mounted along an axial direction inside the vibrational mixing chamber; one end of the vibrational mixing chamber is provided with a discharge port, and the discharge port is connected to the passive mixing and printing nozzle; and a side surface of the vibrational mixing chamber is provided with a plurality of feed ports configured to be connected to the plurality of anti-settling feeding modules.

12. The 3D printing device according to claim 11, wherein the side surface of the vibrational mixing chamber is provided with a feed port I and a feed port II, the feed port I is connected to an anti-settling feeding module I of the plurality of anti-settling feeding modules, and the feed port II is connected to an anti-settling feeding module II of the plurality of anti-settling feeding modules; and
the anti-settling feeding module I is configured to place a printing material I, the printing material I is a first printing raw material, and the first printing raw material is a photocurable or thermocurable material; the anti-settling feeding module II is configured to place a printing material II, and the printing material II is a uniformly mixed liquid of the first printing raw material and a second printing raw material; and the second printing raw material is a micro-nano material.

13. The 3D printing device for integrated manufacturing of functionally gradient materials and three dimensional structures-according to claim 2, wherein the passive mixing and printing nozzle comprises a static mixer and a passive mixing and printing nozzle, the passive mixing and printing nozzle is mounted at one end of the static mixer, and the other end of the static mixer is connected to a passive mixing feed port and a passive mixing positive pressure air port; and
the passive mixing feed port is connected to the active mixing module through a hose, and the passive mixing positive pressure air port is connected to a positive pressure air passage through a hose; and the passive mixing and printing nozzle is connected to a positive electrode of a high voltage DC power supply.

14. The 3D printing device according to claim 2, further comprising a UV curing module and an auxiliary observation camera module mounted on the XYZ three-axis module, wherein the UV curing module comprises a UV curing unit and a cylinder module III capable of driving the UV curing unit to move up and down.

15. The 3D printing device according to claim 2, wherein a printing platform for placing a substrate is disposed below the passive mixing and printing nozzle, the printing platform is mounted above a bottom plate through a base, the printing platform is provided with a heater, and the printing platform can be levelable.

16. A method for integrally preparing functionally gradient materials and manufacturing three-dimensional structures using the 3D printing device according to claim 2, comprising:
step 1: preprocessing of printing:
placing a first printing raw material as a printing material I into an anti-settling feeding module I, placing a printing material II prepared by uniformly mixing the first printing raw material and a second printing raw material according to design requirements into an anti-settling feeding module II, and placing a third printing raw material as a printing material III into an FDM filament feeding module; and
heating a printing platform to a set temperature, enabling the FDM printing nozzle and a passive mixing and printing nozzle to move to a printing station IIA and the other modules to be in a printing enabled state;
step 2: printing of constraining and sacrificial layer:
enabling a cylinder module IV to drive the FDM printing nozzle to descend to a printing station IIB, turning on the FDM filament feeding module, and using the FDM printing nozzle to complete printing of a restraining layer and a supporting structure according to a set path;
step 3: printing of functionally gradient layer:
moving the passive mixing and printing nozzle to a printing station IA, and enabling the cylinder module II to drive the passive mixing and printing nozzle to descend to a printing station IB; enabling the anti-settling feeding module I and the anti-settling feeding module II to respectively feed the materials to a vibrational mixing chamber in an active mixing module according to a set gradient ratio such that the materials that are mixed by stirring of the active stirring screw and vibration in the active mixing module are further uniformly mixed by a static mixer; and enabling a functionally gradient material to be extruded to a printing nozzle discharge port under the control of an extrusion force of a positive pressure control unit to complete printing of the functionally gradient layer according to a set path; wherein the printed functionally gradient layer material is within the constraining and sacrificial layer;
step 4: curing of functionally gradient layer:
moving a UV curing unit to a printing station IIIA, and enabling the cylinder module III to drive the UV curing unit to descend to a printing station IIIB;
precuring the printed functionally gradient layer according to set time by UV-photocuring or thermocuring; after the functionally gradient layer is precured, and enabling the cylinder module III to drive the UV curing unit to ascend to an initial printing station IIIC;
step 5: repeating operations of steps 2-4 until the printing of all functionally gradient layer structures is completed;
wherein after the printing of the current functionally gradient layer is completed, curing is carried out, where the previous precured functionally gradient layer is fully cured, and the current functionally gradient layer is precured; and
step 6: post-processing of printing:
after the printing of all the functionally gradient layers is completed, turning off the anti-settling feeding module I, the anti-settling feeding module II, and the FDM filament feeding module; enabling the active mixing module, the passive mixing and printing nozzle, the FDM printing nozzle, and the UV curing unit to return to the initial stations; deactivating the heating function of the printing platform; closing a positive pressure air passage and turning off a high voltage DC power supply; and
removing the printed functionally gradient member from the printing platform, and postcuring the functionally gradient member in a UV curing oven or a vacuum oven; and removing the constraining and sacrificial layer to obtain the finished functionally gradient member (product).

17. The method according to claim 16, wherein in step 2, if the printed restraint layer and the supporting structure are micro-scale, a material jet printing mode is adopted; if the printed structure is meso-scale and macro-scale, a material extrusion printing mode is adopted; and
in step 3, if the printed functionally gradient layer structure is micro-scale, the material jet printing mode is adopted; and if the printed structure is meso-scale and macro-scale, the material extrusion printing mode is adopted.

* * * * *